US008830823B2

(12) United States Patent
Koponen et al.

(10) Patent No.: US 8,830,823 B2
(45) Date of Patent: Sep. 9, 2014

(54) DISTRIBUTED CONTROL PLATFORM FOR LARGE-SCALE PRODUCTION NETWORKS

(75) Inventors: Teemu Koponen, San Francisco, CA (US); Martin Casado, Portola Valley, CA (US); Natasha Gude, San Francisco, CA (US); Jeremy Stribling, San Francisco, CA (US)

(73) Assignee: Nicira, Inc., Palo Alto, CA (US)

( * ) Notice: Subject to any disclaimer, the term of this patent is extended or adjusted under 35 U.S.C. 154(b) by 27 days.

(21) Appl. No.: 13/177,538

(22) Filed: Jul. 6, 2011

(65) Prior Publication Data

US 2013/0060929 A1    Mar. 7, 2013

Related U.S. Application Data

(60) Provisional application No. 61/361,912, filed on Jul. 6, 2010, provisional application No. 61/361,913, filed on Jul. 6, 2010, provisional application No. 61/429,753, filed on Jan. 4, 2011, provisional application No. 61/429,754, filed on Jan. 4, 2011, provisional application No. 61/466,453, filed on Mar. 22, 2011, provisional application No. 61/482,205, filed on May 3, 2011, provisional application No. 61/482,615, filed on May 4, 2011, provisional application No. 61/482,616, filed on May 4, 2011, provisional application No. 61/501,743, filed on Jun. 27, 2011, provisional application No. 61/501,785, filed on Jun. 28, 2011.

(51) Int. Cl.
*H04J 1/16* (2006.01)
*H04L 12/931* (2013.01)
*H04L 12/24* (2006.01)
*G06F 11/07* (2006.01)

(52) U.S. Cl.
CPC ............... *H04L 49/70* (2013.01); *G06F 11/07* (2013.01); *H04L 41/0896* (2013.01)
USPC ........................................................ 370/219

(58) Field of Classification Search
CPC . G06F 11/2005; G06F 11/2071; G06F 11/14; G06F 11/16; G06F 11/0703; G06F 11/07
USPC ............................................ 709/224; 370/219
See application file for complete search history.

(56) References Cited

U.S. PATENT DOCUMENTS 5,265,092 A    11/1993    Soloway et al.
5,504,921 A     4/1996    Dev et al.
(Continued)

FOREIGN PATENT DOCUMENTS

JP    2002-141905    5/2002
WO    WO 95/06989    3/1995
(Continued)

OTHER PUBLICATIONS

Updated portions of prosecution history of U.S. Appl. No. 12/286,098, May 7, 2013, Casado, Martin, et al.
(Continued)

*Primary Examiner* — Kristie Shingles
(74) *Attorney, Agent, or Firm* — Adeli LLP

(57) ABSTRACT

Some embodiments provide a program that monitors several network controllers in a network. Each network controller manages a logical data path set that is implemented across several managed switching elements. The program detects that a first network controller in the several network controllers has failed. The program selects a second network controller in the several network controllers to manage the logical data path set managed by the first network controller.

21 Claims, 7 Drawing Sheets

(56) References Cited

U.S. PATENT DOCUMENTS

| | | | |
|---|---|---|---|
| 5,729,685 A | 3/1998 | Chatwani et al. | |
| 5,751,967 A | 5/1998 | Raab et al. | |
| 5,774,640 A * | 6/1998 | Kurio | 714/4.3 |
| 5,796,936 A | 8/1998 | Watabe et al. | |
| 5,805,791 A * | 9/1998 | Grossman et al. | 714/23 |
| 5,832,222 A | 11/1998 | Dziadosz et al. | |
| 5,926,463 A | 7/1999 | Ahearn et al. | |
| 5,949,754 A * | 9/1999 | Takahashi | 370/222 |
| 6,006,275 A * | 12/1999 | Picazo et al. | 709/249 |
| 6,055,243 A | 4/2000 | Vincent et al. | |
| 6,104,699 A | 8/2000 | Holender et al. | |
| 6,104,700 A | 8/2000 | Haddock et al. | |
| 6,208,616 B1 * | 3/2001 | Mahalingam et al. | 370/216 |
| 6,219,699 B1 | 4/2001 | McCloghrie et al. | |
| 6,324,275 B1 | 11/2001 | Yagel et al. | |
| 6,366,657 B1 | 4/2002 | Yagel et al. | |
| 6,512,745 B1 | 1/2003 | Abe et al. | |
| 6,680,934 B1 | 1/2004 | Cain | |
| 6,697,338 B1 | 2/2004 | Breitbart et al. | |
| 6,735,602 B2 | 5/2004 | Childress et al. | |
| 6,785,843 B1 | 8/2004 | McRae et al. | |
| 6,894,983 B1 | 5/2005 | Lederman et al. | |
| 6,912,221 B1 | 6/2005 | Zadikian et al. | |
| 6,959,002 B2 | 10/2005 | Wynne et al. | |
| 6,963,585 B1 | 11/2005 | Le Pennec et al. | |
| 7,042,912 B2 | 5/2006 | Ashwood Smith et al. | |
| 7,046,630 B2 | 5/2006 | Abe et al. | |
| 7,126,923 B1 | 10/2006 | Yang et al. | |
| 7,158,972 B2 | 1/2007 | Marsland | |
| 7,197,561 B1 | 3/2007 | Lovy et al. | |
| 7,209,439 B2 | 4/2007 | Rawlins et al. | |
| 7,263,290 B2 | 8/2007 | Fortin et al. | |
| 7,283,473 B2 | 10/2007 | Arndt et al. | |
| 7,286,490 B2 | 10/2007 | Saleh et al. | |
| 7,342,916 B2 | 3/2008 | Das et al. | |
| 7,343,410 B2 | 3/2008 | Mercier et al. | |
| 7,359,971 B2 | 4/2008 | Jorgensen | |
| 7,406,401 B2 * | 7/2008 | Ota et al. | 702/188 |
| 7,450,598 B2 | 11/2008 | Chen et al. | |
| 7,478,173 B1 | 1/2009 | Delco | |
| 7,555,002 B2 | 6/2009 | Arndt et al. | |
| 7,587,492 B2 | 9/2009 | Dyck et al. | |
| 7,590,669 B2 | 9/2009 | Yip et al. | |
| 7,606,260 B2 | 10/2009 | Oguchi et al. | |
| 7,649,851 B2 | 1/2010 | Takashige et al. | |
| 7,710,874 B2 | 5/2010 | Balakrishnan et al. | |
| 7,764,599 B2 | 7/2010 | Doi et al. | |
| 7,783,856 B2 | 8/2010 | Hashimoto et al. | |
| 7,802,251 B2 | 9/2010 | Kitamura | |
| 7,826,482 B1 | 11/2010 | Minei et al. | |
| 7,856,549 B2 | 12/2010 | Wheeler | |
| 7,912,955 B1 | 3/2011 | Machiraju et al. | |
| 7,925,661 B2 | 4/2011 | Broussard et al. | |
| 7,936,770 B1 | 5/2011 | Frattura et al. | |
| 7,945,658 B1 | 5/2011 | Nucci et al. | |
| 7,948,986 B1 | 5/2011 | Ghosh et al. | |
| 7,970,917 B2 | 6/2011 | Nakano et al. | |
| 7,995,483 B1 | 8/2011 | Bayar et al. | |
| 8,027,354 B1 | 9/2011 | Portolani et al. | |
| 8,031,633 B2 | 10/2011 | Bueno et al. | |
| 8,032,899 B2 | 10/2011 | Archer et al. | |
| 8,060,875 B1 | 11/2011 | Lambeth | |
| 8,089,871 B2 | 1/2012 | Iloglu et al. | |
| 8,130,648 B2 | 3/2012 | Kwan et al. | |
| 8,155,028 B2 | 4/2012 | Abu-Hamdeh et al. | |
| 8,161,152 B2 | 4/2012 | Ogielski et al. | |
| 8,199,750 B1 | 6/2012 | Schultz et al. | |
| 8,223,668 B2 | 7/2012 | Allan et al. | |
| 8,265,075 B2 | 9/2012 | Pandey | |
| 8,339,959 B1 | 12/2012 | Moisand et al. | |
| 8,339,994 B2 | 12/2012 | Gnanasekaran et al. | |
| 2001/0043614 A1 | 11/2001 | Viswanadham et al. | |
| 2002/0034189 A1 | 3/2002 | Haddock et al. | |
| 2002/0093952 A1 | 7/2002 | Gonda | |
| 2002/0194369 A1 | 12/2002 | Rawlins et al. | |
| 2003/0009552 A1 | 1/2003 | Benfield et al. | |
| 2003/0058850 A1 | 3/2003 | Rangarajan et al. | |
| 2003/0204768 A1 | 10/2003 | Fee | |
| 2004/0054680 A1 | 3/2004 | Kelley et al. | |
| 2004/0054793 A1 | 3/2004 | Coleman | |
| 2004/0073659 A1 | 4/2004 | Rajsic et al. | |
| 2004/0098505 A1 | 5/2004 | Clemmensen | |
| 2004/0210889 A1 | 10/2004 | Childress et al. | |
| 2004/0267866 A1 | 12/2004 | Carollo et al. | |
| 2004/0267897 A1 | 12/2004 | Hill et al. | |
| 2005/0018669 A1 | 1/2005 | Arndt et al. | |
| 2005/0021683 A1 | 1/2005 | Newton et al. | |
| 2005/0027881 A1 | 2/2005 | Figueira et al. | |
| 2005/0050377 A1 | 3/2005 | Chan et al. | |
| 2005/0120160 A1 | 6/2005 | Plouffe et al. | |
| 2005/0132044 A1 | 6/2005 | Guingo et al. | |
| 2005/0201398 A1 | 9/2005 | Naik et al. | |
| 2005/0232230 A1 | 10/2005 | Nagami et al. | |
| 2006/0026225 A1 | 2/2006 | Canali et al. | |
| 2006/0028999 A1 | 2/2006 | Iakobashvili et al. | |
| 2006/0037075 A1 | 2/2006 | Frattura et al. | |
| 2006/0092976 A1 | 5/2006 | Lakshman et al. | |
| 2006/0174087 A1 | 8/2006 | Hashimoto et al. | |
| 2006/0178898 A1 | 8/2006 | Habibi | |
| 2006/0184653 A1 | 8/2006 | van Riel | |
| 2006/0184937 A1 | 8/2006 | Abels et al. | |
| 2006/0193266 A1 | 8/2006 | Siddha et al. | |
| 2006/0221961 A1 | 10/2006 | Basso et al. | |
| 2006/0248179 A1 | 11/2006 | Short et al. | |
| 2006/0282895 A1 | 12/2006 | Rentzis et al. | |
| 2007/0028239 A1 | 2/2007 | Dyck et al. | |
| 2007/0043860 A1 | 2/2007 | Pabari | |
| 2007/0050763 A1 | 3/2007 | Kagan et al. | |
| 2007/0156919 A1 | 7/2007 | Potti et al. | |
| 2007/0174429 A1 | 7/2007 | Mazzaferri et al. | |
| 2007/0220358 A1 | 9/2007 | Goodill et al. | |
| 2007/0234302 A1 | 10/2007 | Suzuki et al. | |
| 2007/0239987 A1 | 10/2007 | Hoole et al. | |
| 2007/0240160 A1 | 10/2007 | Paterson-Jones et al. | |
| 2007/0245082 A1 | 10/2007 | Margolus et al. | |
| 2007/0250608 A1 | 10/2007 | Watt | |
| 2007/0260721 A1 | 11/2007 | Bose et al. | |
| 2007/0266433 A1 | 11/2007 | Moore | |
| 2007/0286185 A1 | 12/2007 | Eriksson et al. | |
| 2007/0297428 A1 | 12/2007 | Bose et al. | |
| 2008/0002579 A1 | 1/2008 | Lindholm et al. | |
| 2008/0002683 A1 | 1/2008 | Droux et al. | |
| 2008/0034249 A1 | 2/2008 | Husain et al. | |
| 2008/0040467 A1 | 2/2008 | Mendiratta et al. | |
| 2008/0049614 A1 | 2/2008 | Briscoe et al. | |
| 2008/0049621 A1 | 2/2008 | McGuire et al. | |
| 2008/0052206 A1 | 2/2008 | Edwards et al. | |
| 2008/0059556 A1 | 3/2008 | Greenspan et al. | |
| 2008/0163207 A1 | 7/2008 | Reumann et al. | |
| 2008/0189769 A1 | 8/2008 | Casado et al. | |
| 2008/0196100 A1 | 8/2008 | Madhavan et al. | |
| 2008/0212963 A1 | 9/2008 | Fortin et al. | |
| 2008/0225780 A1 | 9/2008 | McCormick et al. | |
| 2008/0225853 A1 | 9/2008 | Melman et al. | |
| 2008/0291910 A1 | 11/2008 | Tadimeti et al. | |
| 2009/0031041 A1 | 1/2009 | Clemmensen | |
| 2009/0043823 A1 | 2/2009 | Iftode et al. | |
| 2009/0083445 A1 | 3/2009 | Ganga | |
| 2009/0089625 A1 | 4/2009 | Kannappan et al. | |
| 2009/0097495 A1 | 4/2009 | Palacharla et al. | |
| 2009/0122710 A1 | 5/2009 | Bar-Tor et al. | |
| 2009/0138577 A1 | 5/2009 | Casado et al. | |
| 2009/0144220 A1 | 6/2009 | Feng et al. | |
| 2009/0150527 A1 | 6/2009 | Tripathi et al. | |
| 2009/0161547 A1 | 6/2009 | Riddle et al. | |
| 2009/0222924 A1 | 9/2009 | Droz et al. | |
| 2009/0276661 A1 | 11/2009 | Deguchi et al. | |
| 2009/0279536 A1 | 11/2009 | Unbehagen et al. | |
| 2009/0292858 A1 | 11/2009 | Lambeth et al. | |
| 2009/0303880 A1 | 12/2009 | Maltz et al. | |
| 2010/0046531 A1 | 2/2010 | Louati et al. | |
| 2010/0061231 A1 | 3/2010 | Harmatos et al. | |
| 2010/0082799 A1 | 4/2010 | DeHaan et al. | |
| 2010/0115101 A1 | 5/2010 | Lain et al. | |

(56) References Cited

U.S. PATENT DOCUMENTS

| | | |
|---|---|---|
| 2010/0131636 A1 | 5/2010 | Suri et al. |
| 2010/0153554 A1 | 6/2010 | Anschutz et al. |
| 2010/0165877 A1 | 7/2010 | Shukla et al. |
| 2010/0169467 A1 | 7/2010 | Shukla et al. |
| 2010/0191612 A1 | 7/2010 | Raleigh |
| 2010/0191846 A1 | 7/2010 | Raleigh |
| 2010/0192207 A1 | 7/2010 | Raleigh |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0257263 A1 | 10/2010 | Casado et al. |
| 2010/0275199 A1 | 10/2010 | Smith et al. |
| 2010/0290485 A1 | 11/2010 | Martini et al. |
| 2011/0004913 A1 | 1/2011 | Nagarajan et al. |
| 2011/0010578 A1 | 1/2011 | Dominguez et al. |
| 2011/0016215 A1 | 1/2011 | Wang |
| 2011/0026521 A1 | 2/2011 | Gamage et al. |
| 2011/0032830 A1 | 2/2011 | Merwe et al. |
| 2011/0075664 A1 | 3/2011 | Lambeth et al. |
| 2011/0085557 A1 | 4/2011 | Gnanasekaran et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2012/0120964 A1 | 5/2012 | Koponen et al. |
| 2012/0147898 A1 | 6/2012 | Koponen et al. |
| 2013/0058208 A1 | 3/2013 | Pfaff et al. |
| 2013/0058215 A1 | 3/2013 | Koponen et al. |
| 2013/0058225 A1 | 3/2013 | Casado et al. |
| 2013/0058226 A1 | 3/2013 | Casado et al. |
| 2013/0058228 A1 | 3/2013 | Koponen et al. |
| 2013/0058229 A1 | 3/2013 | Casado et al. |
| 2013/0058250 A1 | 3/2013 | Casado et al. |
| 2013/0058251 A1 | 3/2013 | Koponen et al. |
| 2013/0058252 A1 | 3/2013 | Casado et al. |
| 2013/0058255 A1 | 3/2013 | Casado et al. |
| 2013/0058331 A1 | 3/2013 | Thakkar et al. |
| 2013/0058334 A1 | 3/2013 | Koponen et al. |
| 2013/0058335 A1 | 3/2013 | Koponen et al. |
| 2013/0058339 A1 | 3/2013 | Casado et al. |
| 2013/0058340 A1 | 3/2013 | Lambeth et al. |
| 2013/0058341 A1 | 3/2013 | Fulton et al. |
| 2013/0058342 A1 | 3/2013 | Casado et al. |
| 2013/0058343 A1 | 3/2013 | Casado et al. |
| 2013/0058344 A1 | 3/2013 | Casado et al. |
| 2013/0058348 A1 | 3/2013 | Koponen et al. |
| 2013/0058350 A1 | 3/2013 | Fulton |
| 2013/0058351 A1 | 3/2013 | Casado et al. |
| 2013/0058353 A1 | 3/2013 | Koponen et al. |
| 2013/0058354 A1 | 3/2013 | Casado et al. |
| 2013/0058356 A1 | 3/2013 | Koponen et al. |
| 2013/0058357 A1 | 3/2013 | Koponen et al. |
| 2013/0058358 A1 | 3/2013 | Fulton et al. |
| 2013/0060736 A1 | 3/2013 | Casado et al. |
| 2013/0060737 A1 | 3/2013 | Koponen et al. |
| 2013/0060738 A1 | 3/2013 | Koponen et al. |
| 2013/0060817 A1 | 3/2013 | Koponen et al. |
| 2013/0060818 A1 | 3/2013 | Lambeth et al. |
| 2013/0060819 A1 | 3/2013 | Lambeth et al. |
| 2013/0060922 A1 | 3/2013 | Koponen et al. |
| 2013/0060940 A1 | 3/2013 | Koponen et al. |

FOREIGN PATENT DOCUMENTS

| | | |
|---|---|---|
| WO | WO 2005/112390 | 11/2005 |
| WO | WO 2008/095010 | 8/2008 |
| WO | WO 2009/042919 | 4/2009 |
| WO | WO 2010/115060 | 10/2010 |

OTHER PUBLICATIONS

Updated portions of prosecution history of U.S. Appl. No. 12/753,044, Feb. 19, 2013, Casado, Martin, et al.
Portions of prosecution history of U.S. Appl. No. 13/177,529, May 31, 2013, Koponen, Teemu, et al.
Portions of prosecution history of U.S. Appl. No. 13/177,530, May 31, 2013, Koponen, Teemu, et al.
Portions of prosecution history of U.S. Appl. No. 13/177,531, May 2, 2013, Koponen, Teemu, et al.
Portions of prosecution history of U.S. Appl. No. 13/177,532, Mar. 15, 2013, Casado, Martin, et al.
Portions of prosecution history of U.S. Appl. No. 13/177,533, May 31, 2013, Koponen, Teemu, et al.
Portions of prosecution history of U.S. Appl. No. 13/177,534, Apr. 9, 2013, Casado, Martin, et al.
Portions of prosecution history of U.S. Appl. No. 13/177,535, Jan. 17, 2013, Casado, Martin, et al.
Portions of prosecution history of U.S. Appl. No. 13/177,536, May 15, 2012, Koponen, Teemu, et al.
Portions of prosecution history of U.S. Appl. No. 13/177,537, May 20, 2013, Koponen, Teemu, et al.
Portions of prosecution history of U.S. Appl. No. 13/177,539, May 31, 2013, Casado, Martin, et al.
Portions of prosecution history of U.S. Appl. No. 13/177,540, Mar. 15, 2013, Lambeth, W. Andrew, et al.
Portions of prosecution history of U.S. Appl. No. 13/177,543, Apr. 22, 2013, Koponen, Teemu, et al.
Portions of prosecution history of U.S. Appl. No. 13/177,545, May 31, 2013, Fulton, Bryan J., et al.
Portions of prosecution history of U.S. Appl. No. 13/177,546, Sep. 26, 2011, Fulton, Bryan J., et al.
Portions of prosecution history of U.S. Appl. No. 13/218,433, Apr. 22, 2013, Koponen, Teemu, et al.
Portions of prosecution history of commonly owned U.S. Appl. No. 12/286,098, listed as item #63 above, including action(s) dated Nov. 7, 2012, Feb. 21, 2012, Nov. 8, 2011, Jun. 22, 2011, Mar. 24, 2011, Aug. 18, 2010, and May 5, 2010; and response(s)/amendment(s) filed Jun. 21, 2012, Oct. 24, 2011, Apr. 14, 2011, Mar. 14, 2011, Feb. 18, 2011, Jun. 4, 2010, and Sep. 24, 2009 (177 pages).
Portions of prosecution history of commonly owned U.S. Appl. No. 12/753,044, listed as item #72 above, including action(s) dated Sep. 24, 2012, Jan. 24, 2012, and Nov. 8, 2011; and response(s)/amendment(s) filed Jul. 24, 2012, Dec. 8, 2011, and Mar. 31, 2011 (108 pages).
Adya, Atul, et al., "Cooperative Task Management without Manual Stack Management," Jun. 2002, 14 pages, Proceedings of the Usenix Annual Technical Conference, Monterey, CA, USA.
Andersen, David, et al., "Resilient Overlay Networks," Oct. 2001, 15 pages, 18th ACM Symp. on Operating Systems Principles (SOSP), Banff, Canada, ACM.
Anderson, Thomas, et al., "Overcoming the Internet Impasse through Virtualization," Apr. 2005, pp. 34-41, IEEE Computer Society.
Anhalt, Fabienne, et al., "Analysis and evaluation of a XEN based virtual router," Sep. 2008, pp. 1-60, Unite de recherché INRA Phone-Alpes, Montbonnot Saint-Ismier, France.
Anwer, Muhammad Bilal, et al., "Building a Fast, Virtualized Data Plane with Programmable Hardware," Aug. 17, 2009, pp. 1-8, VISA'09, Barcelona, Spain, ACM.
Author Unknown , "Cisco Nexis 1000V Series Switches," Date Unknown but prior to Jul. 29, 2010, 2 pages, Cisco Systems, Inc., http://web.archive.org/web/20100729045626/http://www.cisco.com/en/US/Products/ps9902/index.html.
Author Unknown , "Cisco VN-Link: Virtualization-Aware Networking," Month Unknown, 2009, 10 pages, Cisco Systems, Inc.
Author Unknown , "Citrix Launches New XenServer Release as Market Share Growth Continues," Oct. 6, 2010, 3 pages, Citrix Systems, Inc. (http://www.citrix.com/English/ne/news/news.asp?newsID=2304355).
Author Unknown, "HP OpenView Enterprise Management Starter Solution," Jun. 2006, p. 1-4, Hewlett-Packard Development Company, HP.
Author Unknown, "HP OpenView Operations 8.0 for UNIX Developer's Toolkit," Month Unlknown, 2004, pp. 1-4, Hewlett-Packard Development Company, HP.
Author Unknown , "HP Web Jetadmin Integration into HP OpenView Network Node Manager," Feb. 2004, pp. 1-12, HP.
Author Unknown , "IEEE Standard for Local and metropolitan area networks—Virtual Bridged Local Area Networks, Amendment 5:

(56) References Cited

OTHER PUBLICATIONS

Connectivity Fault Management," IEEE Std 802.1ag, Dec. 17, 2007, 260 pages, IEEE, New York, NY, USA.
Author Unknown, "Intel 82599 10 Gigabit Ethernet Controller: Datasheet, Revision: 2.73," Dec. 2011, 930 pages, Intel Corporation.
Author Unknown, "Introduction to VMware Infrastructure: ESX Server 3.5, ESX Server 3i version 3.5, VirtualCenter 2.5," Revision Dec. 13, 2007, pp. 1-46, VMware, Inc., Palo Alto, California, USA.
Author Unknown, "iSCSI SAN Configuration Guide: ESX Server 3.5, ESX Server 3i version 3.5, VirtualCenter 2.5," Revision Nov. 29, 2007, pp. 1-132, VMware, Inc., Palo Alto, CA, USA.
Author Unknown, "Open vSwitch, An Open Virtual Switch," Date Unknown but prior to Dec. 30, 2010, 2 pages, http://www.openvswitch.org/, Open vSwitch.
Author Unknown, "OpenFlow Switch Specification, Version 0.9.0 (Wire Protocol 0x98)," Jul. 20, 2009, pp. 1-36, Open Networking Foundation.
Author Unknown, OpenFlow Switch Specification, Version 1.0.0 (Wire Protocol 0x01), Dec. 31, 2009, pp. 1-42, Open Networking Foundation.
Author Unknown, "Private Network-Network Interface Specification Version 1.1 (PNNI 1.1)," The ATM Forum Technical Committee, Apr. 2002, 536 pages, The ATM Forum.
Author Unknown, "Single Root I/O Virtualization and Sharing Specification, Revision 1.0," Sep. 11, 2007, pp. 1-84, PCI-SIG.
Author Unknown, "Virtual Machine Device Queues," White Paper, Month Unknown, 2007, pp. 1-4, Intel Corporation.
Author Unknown, "VMare for Linus Networking Support," Date Unknown but prior to Nov. 17, 1999, pp. 1-5, VMWare, Inc.
Ballani, Hitesh, et al., "Making Routers Last Longer with ViAggre," NSDI'09: 6th USENIX Symposium on Networked Systems Design and Implementation, Apr. 2009, pp. 453-466, USENIX Association.
Barham, Paul, et al., "Xen and the Art of Virtualization," Oct. 19-22, 2003, pp. 1-14, SOSP'03, Bolton Landing New York, USA.
Bavier, Andy, et. al., "In VINI Veritas: Realistic and Controlled Network Experimentation," SIGCOMM'06, Sep. 2006, pp. 1-14, Pisa, Italy.
Bhatia, Sapan, et al., "Trellis: A Platform for Building Flexible, Fast Virtual Networks on Commodity Hardware," ROADS'08, Dec. 9, 2008, pp. 1-6, Madrid, Spain, ACM.
Caesar, Matthew, et al., "Design and Implementation of a Routing Control Platform," NSDI '05: 2nd Symposium on Networked Systems Design & Implementation, Apr. 2005, pp. 15-28, Usenix Association.
Cai, Zheng, et al., "The Preliminary Design and Implementation of the Maestro Network Control Platform," Oct. 1, 2008, pp. 1-17, NSF.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," Seventh ACM SIGCOMM' HotNets Workshop, Nov. 2008, pp. 1-6, ACM.
Casado, Martin, et al., "SANE: A Protection Architecture for Enterprise Networks," In proceedings of Usenix Security, Aug. 2006, pp. 1-15.
Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Cooper, Brian F., et al., "PNUTS: Yahoo!'s Hosted Data Serving Platform," VLDB'08, Aug. 24-30, 2008, pp. 1-12, ACM, Auckland, New Zealand.
Davoli, Renzo, "VDE: Virtual Distributed Ethernet," TRIDENTCOM'05, Feb. 23-25, 2005, pp. 1-8, IEEE Computer Society.
Dixon, Colin, et al., "An End to the Middle," Proceedings of the 12th conference on Hot topics in operating systems USENIX Association, May. 2009, pp. 1-5, Berkeley, CA, USA.
Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, pp. 1-17, ACM New York, NY.
Enns, R., "NETCONF Configuration Protocol," Dec. 2006, pp. 1-96, IETF Trust (RFC 4741).
Farinacci, D., et al., "Generic Routing Encapsulation (GRE)," Mar. 2000, pp. 1-9, The Internet Society (RFC 2784).
Farrel, A., "A Path Computation Element (PCS)—Based Architecture," Aug. 2006, pp. 1-41, RFC 4655.
Fischer, Anna, "[PATCH][RFC] net/bridge: add basic VEPA support," Jun. 2009, pp. 1-5, GMANE Org.
Garfinkel, Tal, et al., "A Virtual Machine Introspection Based Architecture for Intrusion Detection," In Proc. Network and Distributed Systems Security Symposium, Feb. 2003, pp. 1-16.
Godfrey, P. Brighten, et al., "Pathlet Routing," SIGCOMM, Aug. 2009, pp. 1-6, ACM.
Greenberg, Albert, et al., "A Clean Slate 4D Approach to Network Control and Management," ACM SIGCOMM Computer Communication Review, Oct. 2005, 12 pages, vol. 35, No. 5.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and the Rise of Commodity Network Hardware," ACM SIGCOMM Computer Communication Review, Apr. 2009, pp. 21-26, vol. 39, No. 2.
Gude, Natasha, et al., "NOX: Towards an Operating System for Networks," ACM SIGCOMM Computer communication Review, Jul. 2008, pp. 105-110, vol. 38, No. 3.
Guo, Chanxiong, et al., "BCube: A High Performance, Server-centric Network Architecture for Modular Data Centers," SIGCOMM'09, Aug. 17-21, 2009, pp. 1-12, ACM, Barcelona, Spain.
Hamilton, James, et al., "Datacenter Networks Are in My Way," Principals of Amazon Series, Oct. 28, 2010, pp. 1-14.
Handley, Mark, et al., "Designing Extensible IP Router Software," Proc. Of NSDI, May 2005, pp. 1-14.
Hinrichs, Timothy L., et al., "Practical Declarative Network Management," WREN'09, Aug. 21, 2009, pp. 1-10, Barcelona, Spain.
Hunt, Patrick, et al., "ZooKeeper: Wait-free Coordination for Internet-Scale Systems," Proc. of Usenix Annual Technical Conference, Month Unknown, 2010, pp. 1-14.
Ioannidis, Sotiris, et al., "Implementing a Distributed Firewall," CCS'00, Month Unknown, 2000, pp. 1-10, ACM, Athens, Greece.
John, John P., et al., "Consensus Routing: The Internet as a Distributed System," Proc. of NSDI, Apr. 2008, pp. 1-14.
Kamath, Daya, et. al., "Edge virtual Bridge Proposal, Version 0. Rev. 0.1," Apr. 23, 2010, pp. 1-72, IEEE.
Katz, D., et. al, "Bidirectional Forwarding Detection, draft-ietf-bfd-base-11.txt," Month Unknown, 2009, pp. 1-51, IETF Trust.
Keller, Eric, et al., "The 'Platform as a Service' Model for Networking," Month Unknown, 2010, pp. 1-6.
Kim, Changhoon, et al., "Floodless in Seattle: A Scalable Ethernet Architecture for Large Enterprises," SIGCOMM'08, Aug. 17-22, 2008, pp. 3-14, ACM, Seattle, Washington, USA.
Kohler, Eddie, et al., "The Click Modular Router," ACM Trans. on Computer Systems, Aug. 2000, 34 pages, vol. 18, No. 3.
Koponen, Teemu, et al., "Onix: A Distributed Control Platform for Large-scale Production Networks," In Proc. OSDI, Oct. 2010, pp. 1-14.
Labovitz, Craig, et al., "Delayed Internet Routing Convergence," SIGCOMM '00, Month Unknown, 2000, pp. 175-187, Stockholm, Sweden.
Labovitz, Craig, et al., "Internet Routing Instability," ACM SIGCOMM '97, Month Unknown, 1997, pp. 1-12, Association for Computing Machinery, Inc.
Lakshminarayanan, Karthik, et al., "Routing as a Service," Month Unknown, 2004, pp. 1-15, Berkeley, California.
Luo, Jianying, et al., "Prototyping Fast, Simple, Secure Switches for Ethane," Month Unknown, 2007, pp. 1-6.
Maltz, David A., et al., "Routing Design in Operational Networks: A Look from the Inside," SIGCOMM'04, Aug. 30-Sep. 3, 2004, pp. 1-14, ACM, Portland, Oregon, USA.
McKeown, Nick, et al., "OpenFlow: Enabling Innovation in Campus Networks," ACS SIGCOMM Computer communication Review, Apr. 2008, pp. 69-74, vol. 38, No. 2.

(56) References Cited

OTHER PUBLICATIONS

Mogul, Jeffrey C., et al., "API Design Challenges for Open Router Platforms on Proprietary Hardware," Oct. 2008, pp. 1-6.

Mysore, Radhka Niranjan, et al., "PortLand: A Scalable Fault-Tolerant Layer 2 Data Center Network Fabric," Proc. of SIGCOMM, Aug. 17-21, 2009, pp. 1-12.

Partridge, Craig, et al., "A 50-Gb/s IP Router," IEEE/ACM Transactions on Networking Jun. 1998, pp. 237-248.

Pelissier, Joe, "Network Interface Virtualization Review," Jan. 2009, pp. 1-38.

Pelissier, Joe, "VNTag 101," May 2008, pp. 1-87.

Peterson, Larry L., et al., "OS Support for General-Purpose Routers," Month Unknown, 1999, 6 pages.

Pettit, Justin, et al., "Virtual Switching in an Era of Advanced Edges," Sep. 2010, 7 pages.

Pfaff, Ben., et al., "Extending Networking into the Virtualization Layer," Proc. of HotNets, Oct. 2009, pp. 1-6.

Phan, Doantam, et al., "Visual Analysis of Network Flow Data with Timelines and Event Plots," Month Unknown, 2007, pp. 1-16, VizSEC.

Rosen, E., et al., "Applicant Statement for BGP/MPLS IP Virtual Private Networks (VPNs)," The Internet Society, RFC 4365, Feb. 2006, pp. 1-32.

Sherwood, Rob, et al., "Can the Production Network Be the Testbed?," Month Unknown, 2010, pp. 1-14.

Sherwood, Rob, et al., "Carving Research Slices Out of Your Production Networks with OpenFlow," ACM SIGCOMM Computer Communications Review, Jan. 2010, pp. 129-130, vol. 40, No. 1.

Sherwood, Rob, et al., "FlowVisor: A Network Virtualization Layer," Oct. 14, 2009, pp. 1-14, OPENFLOW-TR-2009-1.

Spalink, Tammo, et al., "Building a Robust Software-Based Router Using Network Processors," Month Unknown, 2001, pp. 216-229, ACM, Banff, CA.

Tavakoli, Arsalan, et al., "Applying NOX to the Datacenter," Proc. HotNets, Month Unknown, 2009, 6 pages.

Touch, J., et al., "Transparent Interconnection of Lots of Links (TRILL): Problem and Applicability Statement," May 2009, pp. 1-17, IETF Trust, RFC 5556.

Turner, Jon, et al., "Supercharging PlanetLab—High Performance, Multi-Application Overlay Network Platform," SIGCOMM-07, Aug. 27-31, 2007, 12 pages, ACM, Koyoto, Japan.

Turner, Jonathan S., "A Proposed Architecture for the GENI Backbone Platform," ANCS'06, Dec. 3-5, 2006, 10 pages, ACM, San Jose, California, USA.

Wang, Yi, et al., "Virtual Routers on the Move: Live Router Migration as a Network-management Primitive," SIGCOMM 08, Aug. 17-22, 2008, 12 pages, ACM, Seattle, Washington, USA.

Xie, Geoffrey G., et al., "On Static Reachability Analysis of IP Networks," Month Unknown, 2005, pp. 1-14.

Yang, L., et al., "Forwarding and Control Element Separation (ForCES) Framework," Apr. 2004, pp. 1-40, The Internet Society.

Yu, Minlan, et al., "Scalable Flow-Based Networking with DIFANE," In Proc. SIGCOMM Aug. 2010, 16 pages.

\* cited by examiner

DISTRIBUTED CONTROL PLATFORM FOR LARGE-SCALE PRODUCTION NETWORKS

CLAIM OF BENEFIT TO PRIOR APPLICATIONS

This application claims benefit to U.S. Provisional Patent Application 61/361,912, filed on Jul. 6, 2010; U.S. Provisional Patent Application 61/361,913, filed on Jul. 6, 2010; U.S. Provisional Patent Application 61/429,753, filed on Jan. 4, 2011; U.S. Provisional Patent Application 61/429,754, filed on Jan. 4, 2011; U.S. Provisional Patent Application 61/466,453, filed on Mar. 22, 2011; U.S. Provisional Patent Application 61/482,205, filed on May 3, 2011; U.S. Provisional Patent Application 61/482,615, filed on May 4, 2011; U.S. Provisional Patent Application 61/482,616, filed on May 4, 2011; U.S. Provisional Patent Application 61/501,743, filed on Jun. 27, 2011; and U.S. Provisional Patent Application 61/501,785, filed on Jun. 28, 2011.

BACKGROUND

Network data plane technology has improved dramatically over the years with linespeeds, port densities and performance/price all increasing rapidly. However, network control plane mechanisms have advanced at a much slower pace. For example, it takes several years to fully design, and even longer to widely deploy, new routing algorithms, such as Transparent Interconnection of Lots of Links (TRILL) (as described in the Internet Engineering Task Force's Request for Comments 5556 entitled "Transparent Interconnection of Lots of Links (TRILL): Problem and Applicability Statement" dated May 2009 by Touch, J., and Perlman, R.). In recent years, as new intradomain requirements have arisen (e.g., greater scale, increased security, migration of VMs), the inadequacies of our current network control mechanisms have become especially problematic. In response, there is a growing movement, driven by both industry and academia, towards a new network control paradigm called Software-Defined Networking (SDN).

In the SDN paradigm, a network-wide control platform, running on one or more servers in the network, oversees a set of simple switches. The control platform handles state distribution (i.e., collecting information from the switches, distributing the appropriate control state to them, and coordinating the state among the various platform servers) and provides a programmatic interface upon which a wide variety of management applications can be built. For clarification, the term "management application" refers to the control logic needed to implement management features such as routing and access control.

A new network management feature often requires its own distributed protocol, which involves first solving a hard, low-level design problem and then later overcoming the difficulty of deploying this design on switches. With the SDN paradigm, control logic can be written on top of the control platform's higher-level API in order to implement new control functionalities, allowing the control platform to take care of the detail implementation of the distribution mechanism.

In essence, the SDN provides that basic primitives for state distribution should be implemented once in the control platform rather than separately for individual control tasks, and should use well-known and general-purpose techniques from the distributed systems literature rather than the more specialized algorithms found in routing protocols and other network control mechanisms. The SDN paradigm allows network operators to use a single control platform to implement a range of management functions (e.g., routing, traffic engineering, access control, VM migration) over a spectrum of control granularities (from individual flows to large traffic aggregates) in a variety of contexts (e.g., enterprises, datacenters, WANs).

Because the control platform simplifies the duties of both switches (which are controlled by the platform) and the control logic (which is implemented on top of the platform) while allowing great generality of function, the control platform is the crucial enabler of the SDN paradigm. The most important challenges in building a production-quality control platform are generality, scalability, reliability, simplicity, and control-plane performance. First, the control platform's API must allow management applications to deliver a wide range of functionality in a variety of contexts. Second, because network sizes (particularly in the datacenter) are growing rapidly, any scaling limitations should be due to the inherent problems of state management, not the implementation of the control platform. Third, the control platform must handle equipment (and other) failures gracefully. Fourth, the control platform should also simplify the task of building management applications. Fifth, the control platform should not introduce significant additional control plane latencies or otherwise impede management applications (note that data path latencies are unaffected by SDN). However, the requirement here is for adequate control-plane performance, not optimal performance. Therefore, when faced with a tradeoff between generality and control-plane performance, one tries to optimize the former while satisfying the latter.

Despite the high-level interest in SDN, no existing products have been able to satisfy all of these requirements.

In the past, some have proposed an approach toward shielding protocol design from low-level details. Examples of such approach include the 4D project (as described in pages 41-54 of Special Interest Group on Data Communication's (SIGCOMM) Computer Communication Review (CCR) 35, 5 (2005) entitled "A Clean Slate 4D Approach to Network Control and Management" by Greenberg, A., Hjalmtysson, G., Maltz, D. A., Myers, A., Rexford, J., Xie, G., Yan, H., Zhan, J., and Zhang, H.), Routing Control Platform (RCP) (as described in the proceedings of the April 2005 Network System Design and Implementation Symposium entitled "Design and Implementation of a Routing Control Platform" by Caesar, M., Caldwell, D., Feamster, N., Rexford, J., Shaikh, A., and Van Der Merwe, K.), Secure Architecture for the Networked Enterprise (SANE) (as described in the proceedings of the August 2006 Usenix Security Symposium entitled "SANE: A Protection Architecture for Enterprise Networks" by Casado, M., Garfinkel, T., Akella, A., Freedman, M. J., Boneh, D., McKeown, N., and Shenker, S.), Ethane (as described in the proceedings of the August 2007 SIGCOMM conference entitled "Ethane: Taking Control of the Enterprise" by Casado, M., Freedman, M. J., Pettit, J., Luo, J., McKeown, N., and Shenker, S.), Network Operating Systems (NOX) (as described in U.S. Published Patent Publication 2009/0138577), and others. However, none of these examples, except for NOX, could be considered a control platform offering a general-purpose API.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. Architecture and Operation

In some embodiments of the invention, a distributed control platform, called Network Operating System (NOS), provides flexible distribution primitives, such as Distributed Hash Table (DHT) storage and group membership, that allow application designers to make their own performance/scalability tradeoffs, by providing a set of Application Programming Interface (API). Some of the embodiments are described below by reference to an overall network management system.

A. Networking Components

In the environment of some embodiments, a network management system comprises four components: physical infrastructure, connectivity infrastructure, NOS, and the control logic that is implemented by the management application.

In some embodiments, a physical infrastructure includes network switches and routers, as well as any other network elements such as load balancers, that support an interface for allowing NOS to read and write to the state (e.g., forwarding table entries) that controls the element's behavior. In some embodiments, these network elements need not run any software other than that required to support this interface and achieve basic connectivity.

In some embodiments, the network elements contain some method for establishing connectivity with NOS. This connectivity provides the basis for establishing a control channel and may be implemented in-band (i.e., with the network traffic controlled by NOS), or out-of-band (i.e., over a separate physical network). There are only minimal requirements for the chosen mechanism beyond convergence on failure and basic connectivity to an NOS instance (as well as between NOS instances), and thus, when using a separate network, standard IGP protocols such as IS-IS or OSPF are sufficient.

The NOS of some embodiments is a distributed system that runs on one or more physical servers. In some embodiments, multiple instances of NOS can be run on each server. As the control platform, NOS is responsible for giving the control logic programmatic access to the network (e.g., both reading and writing to the network state). In order to scale to very large networks (e.g., millions of ports) and to provide the requisite resilience for production deployments, an NOS instance of some embodiments is also responsible for disseminating network state to other instances within the cluster.

In some embodiments, the network control logic is implemented on top of NOS' API. In this case, the control logic determines the desired network behavior while NOS merely provides the primitives needed to access the appropriate network state.

Figure 1:
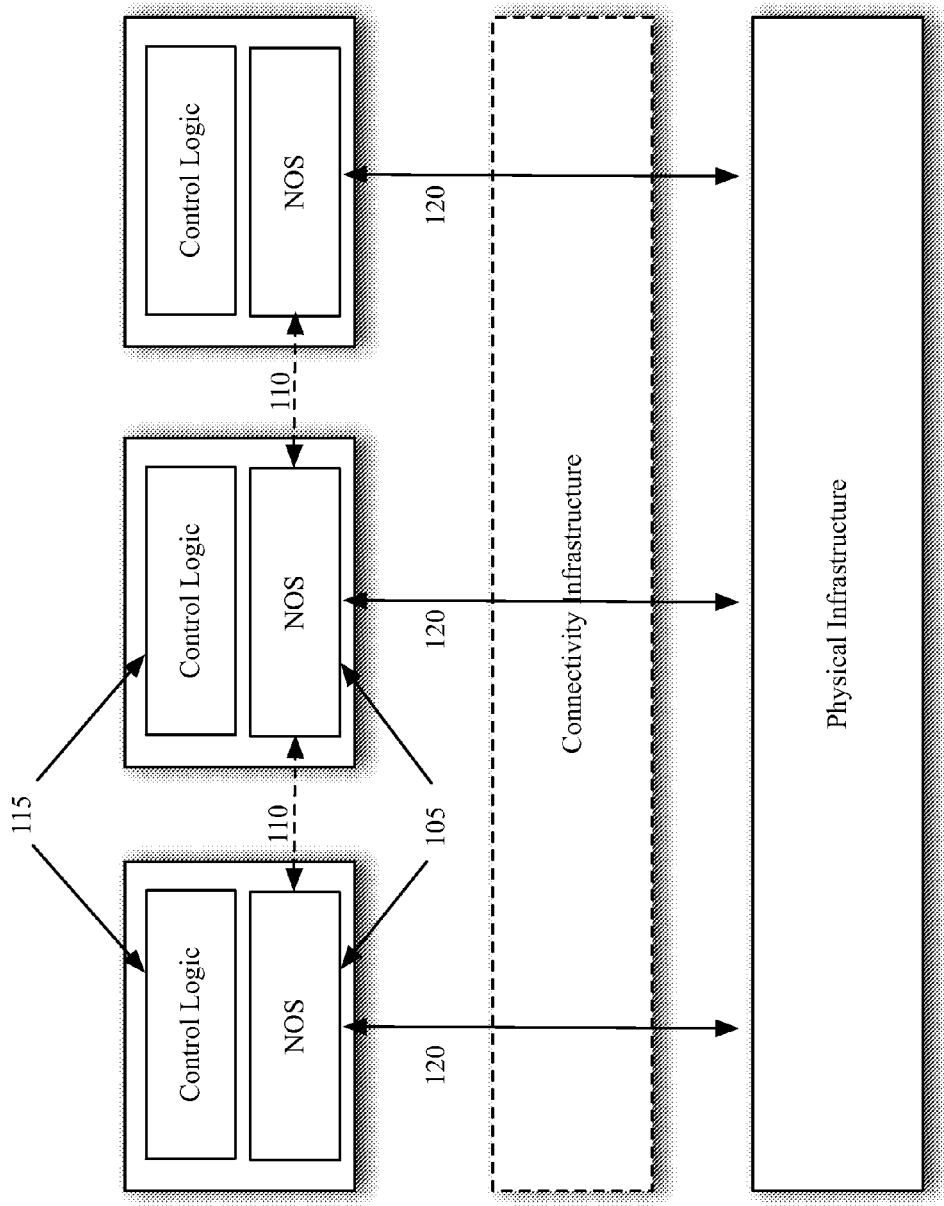
FIG. 1 conceptually illustrates a network management system of some embodiments.

The relationship among these four components is illustrated in FIG. 1. Specifically, FIG. 1 illustrates three NOS instances 105 that coordinate and share (via the lines 110) their views of the underlying network state. In some embodiments, the NOS instances 105 also offer the control logics 115 a read/write interface to that state (via the lines 120) so that the control logics 115 can determine the desired network behavior for the underlying network.

B. NOS API and the Network Information Base

In some embodiments, NOS defines a useful and general API for network control that allows for the development of scalable applications. NOS' API of some embodiments is designed around a view of the physical network, allowing control applications to read and write state to any element in the network. The API is therefore data-centric, providing methods for keeping state consistent between the in-network elements and the control application instances that run on multiple NOS instances.

More specifically, NOS' API of some embodiments comprises a data model that represents the network infrastructure, with each network element corresponding to one or more data objects. In some embodiments, the control logic can (1) read the current state associated with that object, (2) alter the network state by operating on these objects, and (3) register for notifications of state changes to these objects. In addition, since NOS of some embodiments supports a wide range of control scenarios, the control platform allows the control logic to customize the data model and have control over the placement and consistency of each component of the network state.

In some embodiments, a copy of the network state tracked by NOS is stored in a data structure called the Network Information Base (NIB), which is roughly analogous to the Routing Information Base (RIB) used by IP routers. However, rather than just storing prefixes to destinations, the NIB of some embodiments is a graph of all network entities within a network topology. Therefore, the NIB is both the heart of the NOS control model and the basis for NOS' distribution model. Under this scheme, applications control the network by reading and writing to the NIB, and NOS provides scalability and resilience by replicating and distributing the NIB between multiple running instances as configured by the application.

In some embodiments, while NOS handles the replication and distribution of NIB data between instances, it relies on application-specific logic to both detect and provide conflict resolution of network state as it is exchanged between NOS instances as well as between an NOS instance and a network element. The control logic of some embodiments may also dictate the consistency guarantees for state disseminated between NOS instances using distributed locking and consensus algorithms between its instances.

In this example, it is assumed that the NIB only contains physical entities in the network. However, in other embodiments, it can easily be extended to contain logical elements, such as tunnels, and nesting of those logical elements.

At its most generic level, the NIB of some embodiments holds a collection of network entities that are implemented as a set of key-value pairs, and identified by flat, 128-bit, global identifiers. These network entities are the base structure from which all types are derived. In some embodiments, NOS supports stronger typing through typed entities, representing different network elements or their subparts. Typed entities of some embodiments may contain a predefined set of attributes (e.g., using the key-value pairs) and methods to perform operations over those attributes. For instances, in some embodiments, there is a Port entity class that can belong to a list of ports in a Node entity.

Figure 2:
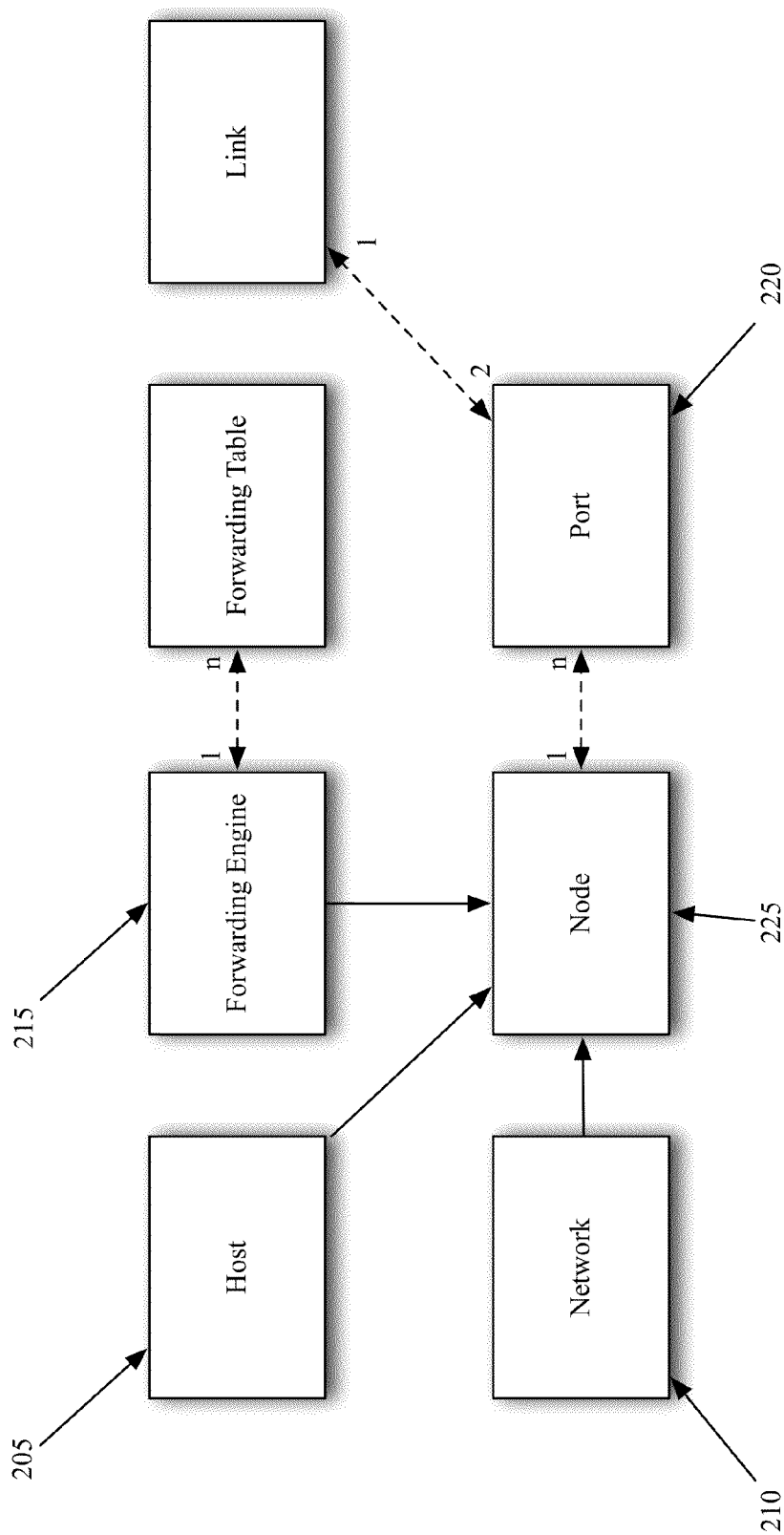
FIG. 2 conceptually illustrates relationships of several NIB entity classes of some embodiments.

The default network entity classes provided by some embodiments of NOS' API are illustrated in FIG. 2. As shown in FIG. 2, solid lines represent inheritance, while dashed lines correspond to referential relation between entity instances. The numbers on the dashed lines show the quantitative mapping relationship. For example, Host 205, Network 210, Forwarding Engine 215, and Port 220 are inherited from the Node class 225. Also, as shown in FIG. 2, one Forwarding Engine may have multiple instances of Forwarding Tables, and one Node may have multiple Ports. In addition, one Link maps to two Ports, and two Ports can map to the same Link. Nodes, ports and links constitute the network topology.

In some embodiments, all entity classes inherit the same base class providing generic key-value pair access. The typeset within NOS of some embodiments is not fixed and applications can subclass these basic classes to extend NOS' data model as needed.

In some embodiments, the NIB provides multiple methods for control logic to gain access to network entities. First, it maintains an index of all of its entities based on the entity identifier, allowing for direct querying of a specific entity. Second, the NIB of some embodiments also supports registration for notifications on state changes or the addition/deletion of an entity. In some embodiments, control applications may further extend the querying capabilities by listening for notifications of entity arrival and maintaining their own indices.

In some cases, the control for a typical application is fairly straightforward. It can register to be notified on some state change (e.g., the addition of new switches and ports), and once notified, it can manipulate the network state by modifying the key-value pairs of the affected entities.

In terms of ensuring consistency of the NIB data, the NIB of some embodiments provides neither fine-grained nor distributed locking mechanisms, but rather a mechanism to request and release exclusive access to the NIB data structure of the local instance. As such, the control logic is only assured that no other thread is updating the NIB within the same controller instance, and needs to implement mechanisms external to the NIB to coordinate an effort with other controller instances to control access to the NIB. In some embodiments, this coordination is static and requires control logic involvement during failure conditions.

In this example, all NIB operations are asynchronous, meaning that updating a network entity only guarantees that the update will eventually be pushed to the corresponding network element and/or other NOS instances. While this has the potential to simplify the control logic and make multiple modifications more efficient, often it is useful to know when an update has successfully completed. For instance, to minimize disruption to network traffic, the control logic of some embodiments requires the updating of forwarding state on multiple switches to happen in a particular order (to minimize, for example, packet drops). For this purpose, the API of some embodiments provides a synchronization primitive: when called for an entity, the control logic will receive a callback once the state has been pushed. After receiving the callback, the control logic of some embodiments will then inspect the contents of the NIB and determine whether its state is still as originally intended.

Alternatively, in other embodiments, the control logic can simply rely on NIB notifications to react to failures in modifications as they would react to any other network state changes. Table 1 below lists available NIB-manipulation methods.

TABLE 1

Functions provided by the NOS NIB API.

| Category | Purpose |
|---|---|
| Query | Find already imported entities. |
| Create, destroy | Create and remove entities. |
| Access attributes | Inspect and modify entities. |
| Notifications | Receive updates about changes. |
| Synchronize | Wait for updates being exported to network elements and controllers. |
| Configuration | Configure how state is imported and exported. |
| Pull | Ask for entities being imported on-demand. |

C. NOS System

Different embodiments of the invention use different types of virtualization applications. One type of virtualization application exposes the definition of different elements at different hierarchical levels in the NIB and the definition of the links between these elements to the control applications that run on top of the NOS and the virtualization application in order to allow the control application to define its operations by reference to these definitions. For instance, in some embodiments, the developer of the control application running on top of the virtualization application uses these definitions to enumerate how the application is to map the logical data path sets of the user to the physical switching elements of the control system. Under this approach, the developer would have to enumerate all different scenarios that the control system may encounter and the mapping operation of the application for each scenario. This type of virtualization is referred to below as Type I network virtualization.

Another type of network virtualization, which is referred to below as Type II network virtualization, does not require the application developers to have intimate knowledge of the NIB elements and the links in the NIB between these elements. Instead, this type of virtualization allows the application to simply provide user specified switching element attributes in the form of one or more tables, which are then mapped to NIB records by a table mapping engine. In other words, the Type II virtualized system of some embodiments accepts switching element configurations (e.g., access control list table configurations, L2 table configurations, L3 table configurations, etc.) that the user defines without referencing any operational state of the switching elements in a particular network configuration. It then maps the user-specified switching element configurations to the switching element configurations stored in the NIB.

Figure 3:
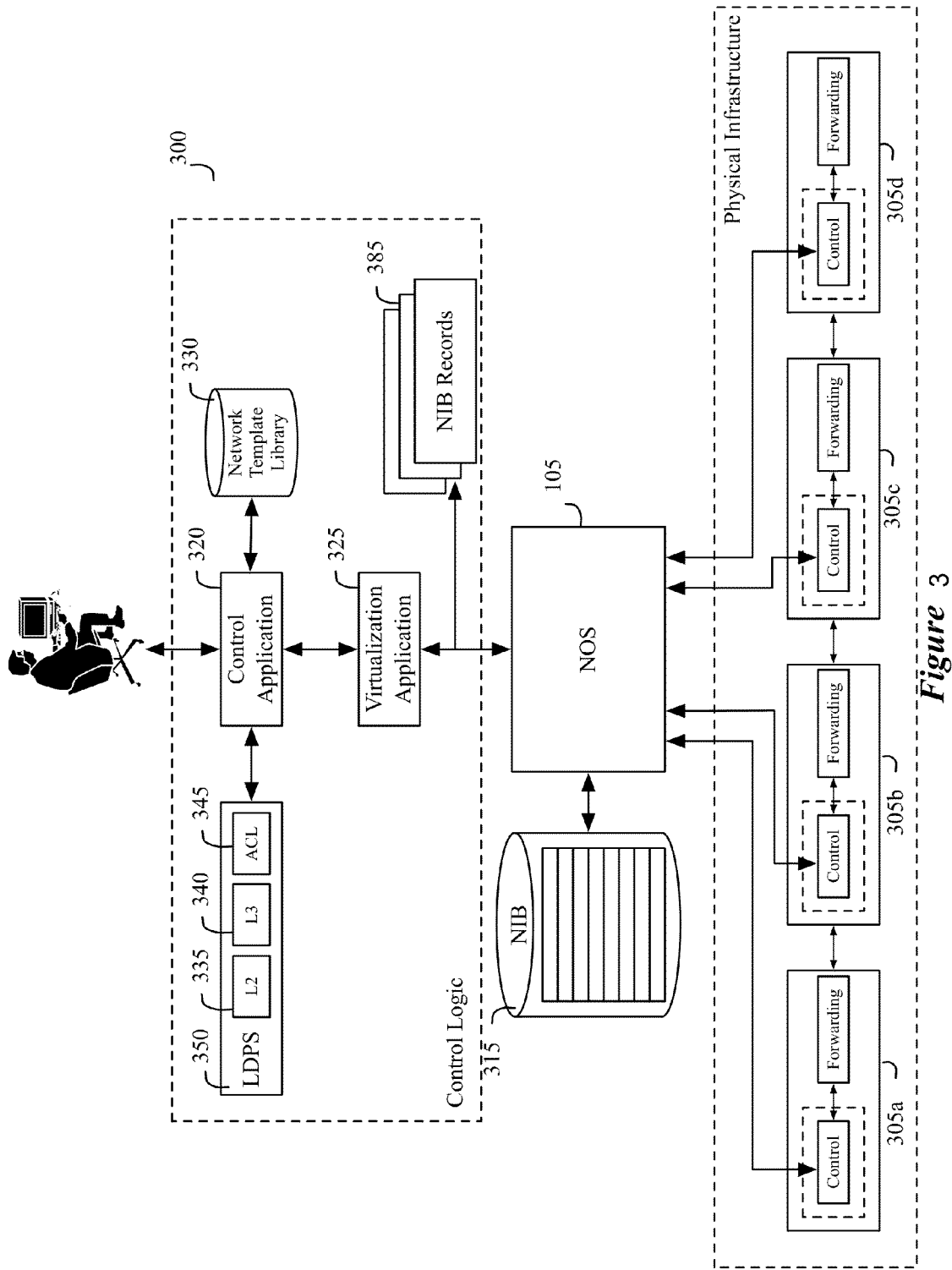
FIG. 3 conceptually illustrates an example of a virtualized system.

FIG. 3 illustrates an example of such a Type II virtualized system that includes one NOS 105, four switching elements 305a-305d, a control application 320, and a virtualization application 325 that run on top of the NOS 105. In some embodiments, the control application 320 allows a user to specify and populate logical data path sets, while the virtualization application 325 implements the specified logical data path sets by mapping the logical data path sets to the physical switching infrastructure.

More specifically, the control application 320 allows (1) a user to specify abstract switching element configurations, which the virtualization application 325 then maps to the data records in the NIB, and (2) the user to view the state of the abstract switching element configurations. In some embodiments, the control application 320 uses a network template library 330 to allow a user to specify a set of logical data paths by specifying one or more switch element attributes (i.e., one or more switch element configurations). In the example shown in FIG. 3, the network template library includes several types of tables that a switching element may include. In this example, the user has interfaced with the control application 320 to specify an L2 table 335, an L3 table 340, and an access control list (ACL) table 345. These three table specify a logical data path set 350 for the user. In some embodiments a logical data path set defines a logical switching element (also referred to as a logical switch). A logical switch in some embodiments is a simulated/conceptual switch that is defined (e.g., by a user) to conceptually describe a set of switching behaviors for a switch. The control application of some embodiments (such as the control application 320 illustrated in FIG. 3) implements this logical switch across one or more physical switches, which as mentioned above may be hardware switches, software switches, or virtual switches defined on top of other switches.

In specifying these tables, the user simply specifies desired switch configuration records for one or more abstract, logical switching elements. When specifying these records, the user of the system 300 does not have any understanding of the switching elements 305a-305d employed by the system nor any data regarding these switching elements from the NIB 315. The only switch-element specific data that the user of the system 300 receives is the data from the network template library, which specifies the types of network elements that the user can define in the abstract, which the system can then process.

While the example in FIG. 3 shows the user specifying an ACL table, one of ordinary skill in the art will realize that the system of some embodiments does not provide such specific switch table attributes in the library 330. For instance, in some embodiments, the switch-element abstractions provided by the library 330 are generic switch tables and do not relate to any specific switching element table, component and/or architecture. In these embodiments, the control application 320 enables the user to create generic switch configurations for a generic set of one or more tables. Accordingly, the abstraction level of the switch-element attributes that the control application 320 allows the user to create is different in different embodiments.

Irrespective of the abstraction level of the switch-element attributes produced through the control logic application, the virtualization application 325 performs a mapping operation that maps the specified switch-element attributes (e.g., the specific or generic switch table records) to records in the NIB. In some embodiments, the virtualization application translates control application input into one or more NIB records 385 that the virtualization application then writes to the NIB through the API set provided by the NOS. From the NIB, these records are then subsequently transferred to the switching infrastructure through the operation of the NOS. In some embodiments, the NIB stores both the logical data path set input received through the control application as well as the NIB records that are produced by the virtualization application.

In some embodiments, the control application can receive switching infrastructure data from the NIB. In response to this data, the control application may modify record(s) associated with one or more logical data path sets (LDPS). Any such modified LDPS record would then be translated to one or more physical switching infrastructure records by the virtualization application, which might then be transferred to the physical switching infrastructure by the NOS.

To map the control application input to physical switching infrastructure attributes for storage in the NIB, the virtualization application of some embodiments uses a database table mapping engine to map input tables, which are created from (1) the control-application specified input tables, and (2) a set of properties associated with switching elements used by the system, to output tables. The content of these output tables are then transferred to the NIB elements.

Some embodiments use a variation of the datalog database language to allow application developers to create the table mapping engine for the virtualization application, and thereby to specify the manner by which the virtualization application maps logical data path sets to the controlled physical switching infrastructure. This variation of the datalog database language is referred to below as nLog. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table-mapping rules engine that is referred to below as the nLog engine. The nLog mapping techniques of some embodiments are further described in U.S. patent application Ser. No. 13/177,533, now published as US2013/0058228, entitled "Network Virtualization Apparatus and Method," filed concurrently with this application.

In some embodiments, the nLog virtualization engine provides feedback (e.g., from one or more of the output tables or from NIB records that are updated to reflect values stored in the output tables) to the user in order to provide the user with state information about the logical data path set that he or she created. In this manner, the updates that the user gets are expressed in terms of the logical space that the user understands and not in terms of the underlying switching element states, which the user does not understand.

The use of nLog serves as a significant distinction between Type I virtualized control systems and Type II virtualized control systems, even for Type II systems that store user specified logical data path sets in the NIB. This is because nLog provides a machine-generated rules engine that addresses the mapping between the logical and physical domains in a more robust, comprehensive manner than the hand-coded approach used for Type I virtualized control systems. In the Type I control systems, the application developers need to have a detailed understanding of the NIB structure and need to use this detailed understanding to write code that addresses all possible conditions that the control system would encounter at runtime. On the other hand, in Type II control systems, the application developers only need to produce applications that express the user-specified logical data path sets in terms of one or more tables, which are then automatically mapped to output tables whose contents are in turn transferred to the NIB. This approach allows the Type II virtualized systems to forego maintaining the data regarding the logical data path sets in the NIB. However, some embodiments maintain this data in the NIB in order to distribute this data among other NOS instances, as further described below.

In some embodiments, the system 300 propagates instructions to control a set of the switching elements 305a-305d through the control application 320, the virtualization application 325, and the NOS 105. Specifically, in some embodiment, the control application 320, the virtualization application 325, and the NOS 105 collectively translate and propagate control plane data through the three layers to a set of the switching elements 305a-305d.

The control application 320 of some embodiments has two logical planes that can be used to express the input to and output from this application. In some embodiments, the first logical plane is a logical control plane that includes a collection of higher-level constructs that allow the control application 320 and its users to define a logical plane for a logical switching element by specifying one or more logical data path sets for a user. The second logical plane in some embodiments is the logical forwarding plane, which represents the logical data path sets of the users in a format that can be processed by the virtualization application 325. In this manner, the two logical planes are logical space analogs of physical control and forwarding planes that are typically found in a typical managed switch.

In some embodiments, the control application 320 defines and exposes the logical control plane constructs with which the application itself or users of the application specifies different logical data path sets. For instance, in some embodiments, the logical control plane data 320 includes the logical ACL table 345, the logical L2 table 335, and the logical L3 table 340. Some of this data can be specified by the user, while other such data are generated by the control application. In some embodiments, the control application 320 generates and/or specifies such data in response to certain changes to the NIB (which indicate changes to the switching elements 305a-305d and the managed data path sets) that the control application 320 detects.

In some embodiments, the logical control plane data (i.e., the LDPS data 350 that is expressed in terms of the control plane constructs) can be initially specified without consideration of current operational data from the switching elements 305a-305d and without consideration of the manner by which this control plane data will be translated to physical control plane data. For instance, the logical control plane data might specify control data for one logical switch that connects five computers, even though this control plane data might later be translated to physical control data for three of the switching elements 305a-305d that implement the desired switching between the five computers.

The control application 320 of some embodiments includes a set of modules (not shown) for converting any logical data path set within the logical control plane to a logical data path set in the logical forwarding plane of the control application 320. Some embodiments may express the logical data path set in the logical forwarding plane of the control application 320 as a set of forwarding tables (e.g., the L2 table 335 and L3 table 340). The conversion process of some embodiments includes the control application 320 populating logical data path tables (e.g., logical forwarding tables) that are created by the virtualization application 325 with logical data path sets. In some embodiments, the control application 320 uses an nLog table mapping engine to perform this conversion. The control application's use of the nLog table mapping engine to perform this conversion is further described in U.S. patent application Ser. No. 13/177,532, now issued as U.S. Pat. No. 8,743,888, entitled "Network Control Apparatus and Method", filed concurrently with this application.

The virtualization application 325 of some embodiments also has two planes of data, a logical forwarding plane and a physical control plane. The logical forwarding plane is identical or similar to the logical forwarding plane produced by the control application 320. In some embodiments, the logical forwarding plane of the virtualization application 325 includes one or more logical data path sets of one or more users. The logical forwarding plane of the virtualization application 325 in some embodiments includes logical forwarding data for one or more logical data path sets of one or more users. Some of this data is pushed directly or indirectly to the logical forwarding plane of the virtualization application 325 by the control application 320, while other such data are pushed to the logical forwarding plane of the virtualization application 325 by the virtualization application 325 detecting events in the NIB.

The physical control plane of the virtualization application 325 includes one or more physical data path sets of one or more users. Some embodiments of the virtualization application 325 include a set of modules (not shown) for converting any LDPS within the logical forwarding plane of the virtualization application 325 to a physical data path set in the physical control plane of the virtualization application 325. In some embodiments, the virtualization application 325 uses the nLog table mapping engine to perform this conversion. The virtualization application 325 also includes a set of modules (not shown) for pushing the control plane data from the physical control plane of the virtualization application 325 into the NIB of the NOS 105.

From the NIB, the physical control plane data is later pushed into a set of the switching elements 305a-305d (e.g., switching elements 305a and 305c). In some embodiments, the physical control plane data is pushed to each of the set of the switching elements 305a-305d by the controller instance that is the master of the switching element. In some cases, the master controller instance of the switching element is the same controller instance that converted the logical control plane data to the logical forwarding plane data and the logical forwarding plane data to the physical control plane data. In other cases, the master controller instance of the switching element is not the same controller instance that converted the logical control plane data to the logical forwarding plane data and the logical forwarding plane data to the physical control plane data. The set of the switching elements 305a-305d then converts this physical control plane data to physical forwarding plane data that specifies the forwarding behavior of the set of the switching elements 305a-305d.

In some embodiments, the physical control plane data that is propagated to the set of the switching elements 305a-305d allows the set of the switching elements 305a-305d to perform the logical data processing on data packets that it processes in order to effectuate the processing of the logical data path sets specified by the control application 320. In some such embodiments, physical control planes include control plane data for operating in the physical domain and control plane data for operating in the logical domain. In other words, the physical control planes of these embodiments include control plane data for processing network data (e.g., packets) through switching elements to implement physical switching and control plane data for processing network data through switching elements in order to implement the logical switching. In this manner, the physical control plane facilitates implementing logical switches across the switching elements. The use of the propagated physical control plane to implement logical data processing in the switching elements is further described in U.S. patent application Ser. No. 13/177,535, now issued as U.S. Pat. No. 8,750,164, entitled "Hierarchical Managed Switch Architecture", filed concurrently with this application.

In addition to pushing physical control plane data to the NIB 315, the control and virtualization applications 320 and 325 also store logical control plane data and logical forwarding plane data in the NIB 315. These embodiments store such data in the NIB 315 for a variety of reasons. For instance, in some embodiments, the NIB 315 serves as a medium for communications between different controller instances, and the storage of such data in the NIB 315 facilitates the relaying of such data across different controller instances.

The NIB 315 in some embodiments serves as a hub for all communications among the control application 320, the virtualization application 325, and the NOS 105. For instance, the control application 320 may store in the NIB logical data path sets in the logical forwarding plane that have been converted from logical data path sets in the logical control plane. The virtualization application 325 may retrieve from the NIB the converted logical data path sets in the logical forwarding plane and then convert the logical data path sets to physical data path sets in the physical control plane of the virtualization application 325. Thus, the NIB of some embodiments serves as a medium for communication between the different processing layers. Also, the NIB 315 in these embodiments stores logical control plane data and logical forwarding plane data as well as physical control plane data.

The above description describes a control data pipeline through three processing layers to a set of the switching elements 305*a*-305*d*. However, in some embodiments, the control data pipeline may have two processing layers instead of three with the upper layer being a single application that performs the functionalities of both the control application 320 and the virtualization application 325. For example, a single virtualization application (also called a network hypervisor) may replace these the control application 320 and the virtualization application 325 in some embodiments. In such embodiments, the control application 320 would form the front end of this network hypervisor, and would create and populate the logical data path sets. The virtualization application 325 in these embodiments would form the back end of the network hypervisor, and would convert the logical data path sets to physical data path sets that are defined in the physical control plane.

In some embodiments, the different processing layers are implemented on a single computing device. Referring to FIG. 3 as an example, some such embodiments may execute the control application 320, and virtualization application 325, and the NOS 105 on a single computing device. However, some embodiments may execute the different processing layers on different computing devices. For instance, the control application 320, and virtualization application 325, and the NOS 105 may each be executed on separate computing devices. Other embodiments may execute any number of processing layers on any number of different computing devices.

D. Secondary Storage Structure

In addition to using the NIB to store switching-element data, the virtualized network-control system of some embodiments also stores other storage structures to store data regarding the switching elements of the network. These other storage structures are secondary storage structures that supplement the storage functions of the NIB, which is the primary storage structure of the system while the system operates. In some embodiments, the primary purpose for one or more of the secondary storage structures is to back up the data in the NIB. In these or other embodiments, one or more of the secondary storage structures serves a purpose other than backing up the data in the NIB (e.g., for storing data that are not in the NIB).

In some embodiments, the NIB is stored in system memory (e.g., RAM) while the system operates. This allows for the fast access of the NIB records. In some embodiments, one or more of the secondary storage structures, on the other hand, are stored on disk or other non-volatile memories that are slower to access. Such non-volatile disk or other storages, however, improve the resiliency of the system as they allow the data to be stored in a persistent manner.

Figure 4:
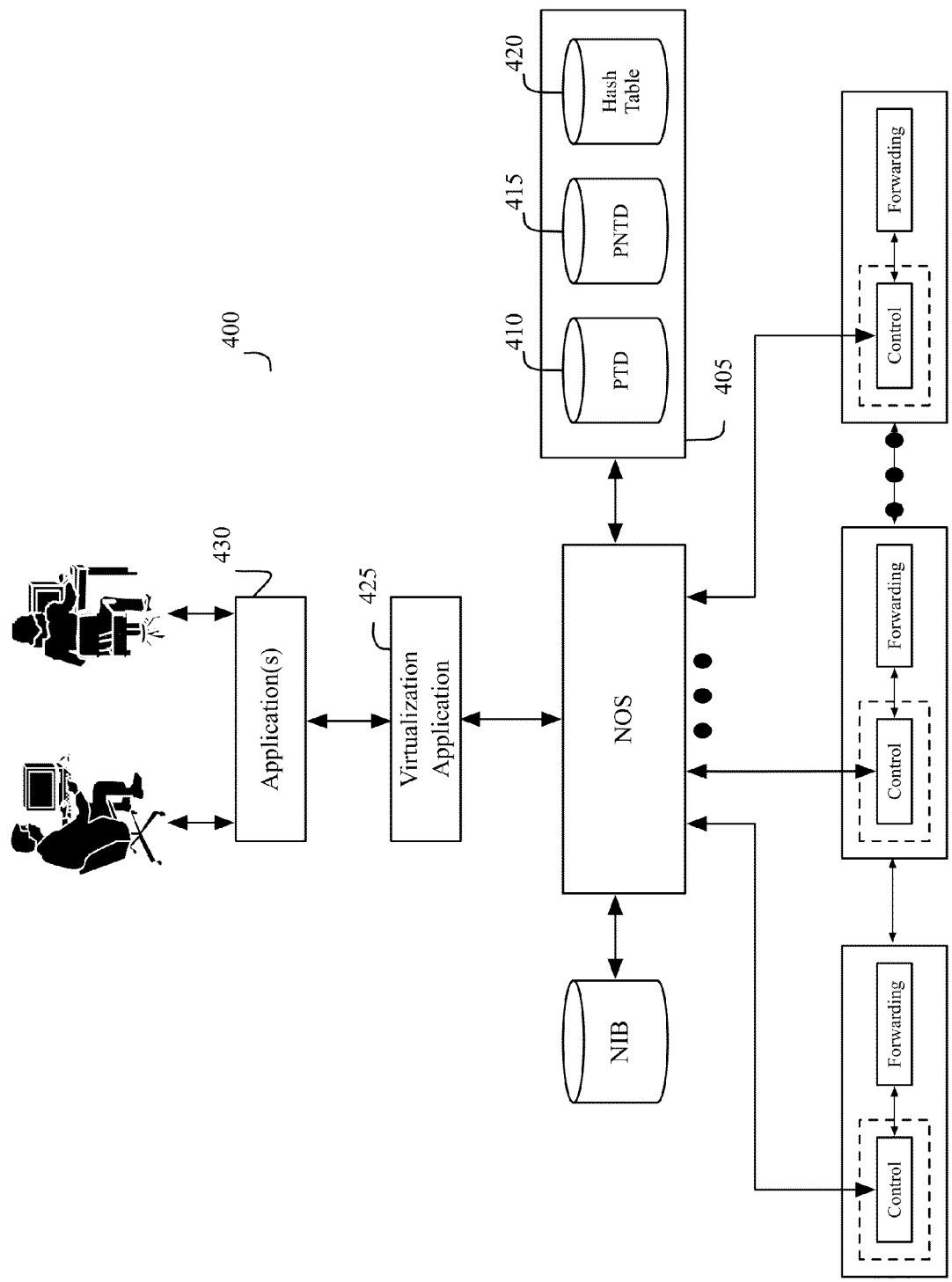
FIG. 4 conceptually illustrates an example of a virtualized system of some embodiments that employs secondary storage structures that supplement storage operations of a NIB.

FIG. 4 illustrates an example of a virtualized system 400 that employs secondary storage structures that supplement the NIB's storage operations. This system is similar to the system 300 of FIG. 3, except that it also includes secondary storage structures 405. In this example, these structures include a persistent transactional database (PTD) 410, a persistent non-transactional database (PNTD) 415, and a hash table 420. In some embodiments, these three types of secondary storage structures store different types of data, store data in different manners, and/or provide different query interfaces that handle different types of queries.

In some embodiments, the PTD 410 is a database that is stored on disk or other non-volatile memory. In some embodiments, the PTD is a commonly available database, such as MySQL or SQLite. The PTD of some embodiments can handle complex transactional queries. As a transactional database, the PTD can undo a series of prior query operations that it has performed as part of a transaction when one of the subsequent query operations of the transaction fails. Moreover, some embodiments define a transactional guard processing (TGP) layer before the PTD in order to allow the PTD to execute conditional sets of database transactions. The TGP layer allows the PTD to avoid unnecessary later database operations when conditions of earlier operations are not met.

The PTD in some embodiments stores the exact replica of the data that are stored in the NIB, while in other embodiments it stores only a subset of the data that are stored in the NIB. Some or all of the data in the NIB are stored in the PTD in order to ensure that the NIB data will not be lost in the event of a crash of the NOS or the NIB.

The PNTD 415 is another persistent database that is stored on disk or other non-volatile memory. Some embodiments use this database to store data (e.g., statistics, computations, etc.) regarding one or more switch element attributes or operations. For instance, this database is used in some embodiment to store the number of packets routed through a particular port of a particular switching element. Other examples of types of data stored in the database 415 include error messages, log files, warning messages, and billing data. Also, in some embodiments, the PNTD stores the results of operations performed by the application(s) 430 running on top of the NOS, while the PTD and hash table store only values generated by the NOS.

The PNTD in some embodiments has a database query manager that can process database queries, but as it is not a transactional database, this query manager cannot handle complex conditional transactional queries. In some embodiments, accesses to the PNTD are faster than accesses to the PTD but slower than accesses to the hash table 420.

Unlike the databases 410 and 415, the hash table 420 is not a database that is stored on disk or other non-volatile memory. Instead, it is a storage structure that is stored in volatile system memory (e.g., RAM). It uses hashing techniques that use hashed indices to quickly identify records that are stored in the table. This structure combined with the hash table's placement in the system memory allows this table to be accessed very quickly. To facilitate this quick access, a simplified query interface is used in some embodiments. For instance, in some embodiments, the hash table has just two queries: a Put query for writing values to the table and a Get query for retrieving values from the table. Some embodiments use the hash table to store data that change quickly. Examples of such quick-changing data include network entity status, statistics, state, uptime, link arrangement, and packet handling information. Furthermore, in some embodiments, the NOS uses the hash tables as a cache to store information that is repeatedly queried for, such as flow entries that will be written to multiple nodes. Some embodiments employ a hash structure in the NIB in order to quickly access records in the NIB. Accordingly, in some of these embodiments, the hash table 420 is part of the NIB data structure.

The PTD and the PNTD improve the resiliency of the NOS system by preserving network data on hard disks. If a NOS system fails, network configuration data will be preserved on disk in the PTD and log file information will be preserved on disk in the PNTD.

E. Multi-Instance Architecture

Figure 5:
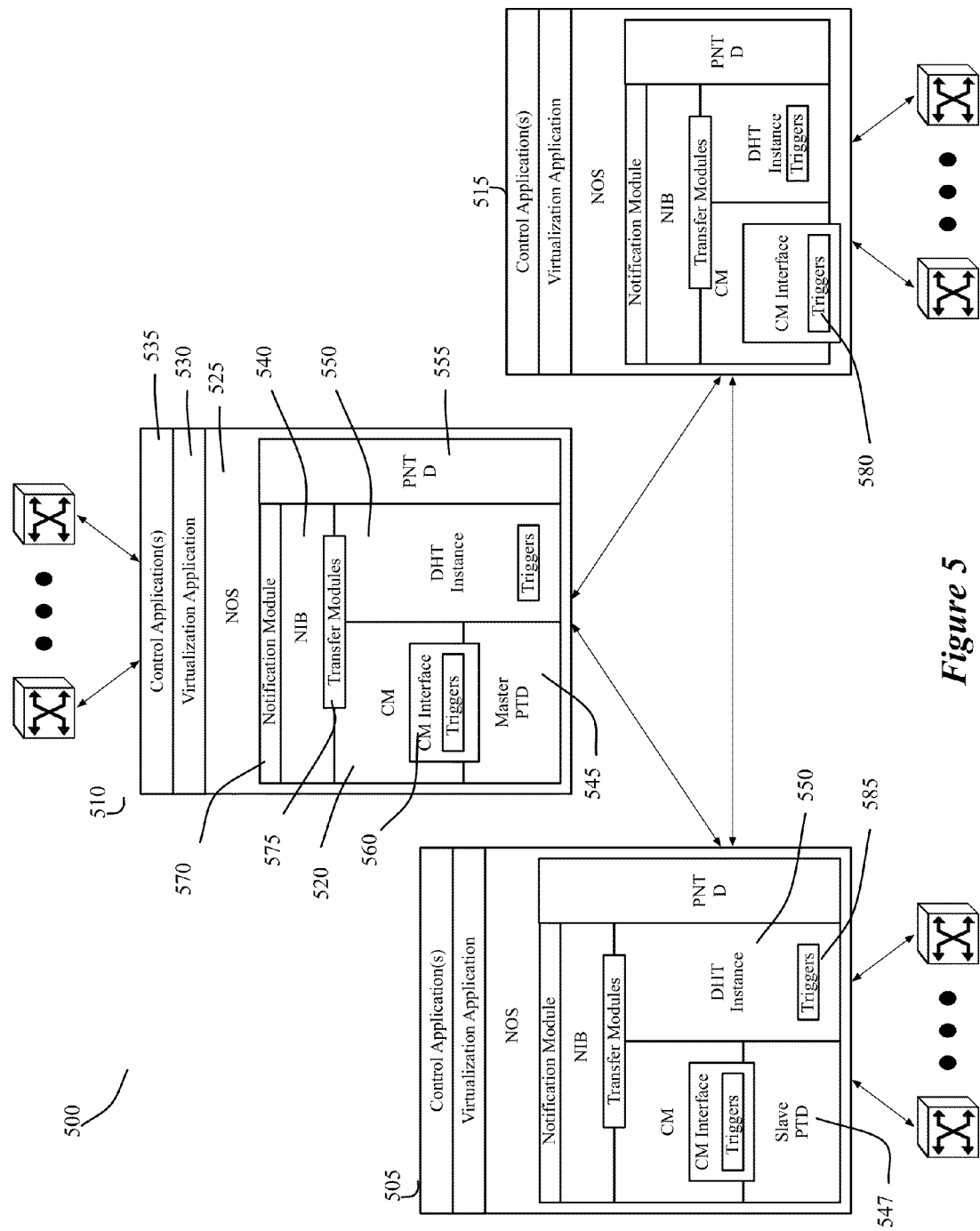
FIG. 5 conceptually illustrates a distributed network control system of some embodiments.

FIG. 5 illustrates a particular distributed network control system 500 of some embodiments of the invention. In some embodiments, the control system 500 uses several different controller instances to control the operations of the same switching elements or of different switching elements. In the example illustrated in FIG. 5, three instances 505, 510 and 515 are illustrated. However, one of ordinary skill in the art will understand that the control system 500 can have any number of controller instances.

As shown, each controller instance includes a NOS 525, a virtualization application 530, one or more control applications 535, and a coordination manager (CM) 520. Each NOS in the system 500 includes a NIB 540 and at least two secondary storage structures, e.g., a distributed hash table (DHT) 550 and a PNTD 555. In addition, each controller includes a NIB notification module 570, NIB transfer modules 575, a CM interface 560, PTD triggers 580, and DHT triggers 585. The controller instance 510 includes a master PTD 545 and the controller instance 505 includes a slave PTD 547.

In some embodiments, the notification module 570 in each controller instance allows applications (e.g., a control application) that run on top of the NOS to register for callbacks when changes occur within the NIB. This module in some embodiments has two components, which include a notification processor and a notification registry. The notification registry stores the list of applications that need to be notified for each NIB record that the module 570 tracks, while the notification processor reviews the registry and processes the notifications upon detecting a change in a NIB record that it tracks. The notification module as well as its notification registry and notification processor are a conceptual representation of the NIB-application layer notification components of some embodiments, as the system of these embodiments provides a separate notification function and registry within each NIB object that can be tracked by the application layer.

The transfer modules 575 include one or more modules that allow data to be exchanged between the NIB 540 on one hand, and the PTD or DHT storage layers in each controller instance on the other hand. In some embodiments, the transfer modules 575 include an import module for importing changes from the PTD/DHT storage layers into the NIB, and an export module for exporting changes in the NIB to the PTD/DHT storage layers.

The control system 500 only has PTDs in some of the NOS instances, and of these PTDs, one of them serves as master PTD 545, while the rest serve as slave PTDs 547. In some embodiments, NIB changes within a controller instance that has a slave PTD are first propagated to the master PTD 545, which then direct the controller instance's slave PTD to record the NIB change. The master PTD 545 similarly receives NIB changes from controller instances that do not have either master or slave PTDs.

In the control system 500, the coordination manager 520 includes the CM interface 560 to facilitate communication between the NIB storage layer and the PTD storage layer. The CM interface also maintains the PTD trigger list 580, which identifies the modules of the system 500 to callback whenever the CM interface 560 is notified of a PTD record change. A similar trigger list 585 for handling DHT callbacks is maintained by the DHT instance 550. The CM 520 also has a DHT range identifier (not shown) that allows the DHT instances of different controller instances to store different DHT records in different DHT instances.

Also, in the control system 500, the PNTD is not placed underneath the NIB storage layer. This placement is to signify that the PNTD in the control system 500 does not exchange data directly with the NIB storage layer, but rather is accessible solely by the application(s) (e.g., the control application) running on top of the NOS 525 as well as other applications of other controller instances. This placement is in contrast to the placement of the PTD storage layer 545/547 and DHT storage layers 550, which are shown to be underneath the NIB storage layer because the PTD and DHT are not directly accessible by the application(s) running on top of the NOS 525. Rather, in the control system 500, data are exchanged between the NIB storage layer and the PTD/DHT storage layers of the same or different instances.

The control system 500 uses the PTD, DHT and PNTD storage layers to facilitate communication between the different controller instances. In some embodiments, each of the three storages of the secondary storage layer uses a different storage and distribution technique to improve the resiliency of the distributed, multi-instance system 500. For instance, the system 500 of some embodiments replicates the PTD across NOS instances so that every NOS has a full copy of the PTD to enable a failed NOS instance to quickly reload its PTD from another instance. On the other hand, the system 500 in some embodiments distributes the PNTD with partial overlapping distributions of data across the NOS instances to reduce the damage of a failure. Similarly, the system 500 in some embodiments distributes the DHT fully or with minimal overlap across multiple controller instances in order to maintain the DHT instance within each instance small. Also, using this approach, allows the system to increase the size of the DHT by adding additional DHT instances in order to make the system more scalable.

One of the advantages of this system is that it can be configured in any number of ways. In some embodiments, this system provides great flexibility to specify the configurations for the components of the system in order to customize its storage and data distribution scheme to achieve the best tradeoff of scalability and speed on one hand, and reliability and consistency on the other hand. Attributes of the storage structures that affect scalability, speed, reliability and consistency considerations include the speed of the storage (e.g., RAM versus disk access speed), the reliability of the storage (e.g., persistent non-volatile storage of disk versus volatile storage of RAM), the query interface of the storage (e.g., simple Put/Get query interface of DHT versus more robust transactional database queries of PTD in some embodiments), and the number of points of failures in the system (e.g., a single point of failure for a DHT record versus multiple points of failure for a PTD record in some embodiments).

Through the configurations of its components, the system can be configured (1) on how to distribute the data records between the NIB and the secondary storage structures within one instance (e.g., which secondary storage should store which NIB record), (2) on how to distribute the data records between the NIBs of different instances (e.g., which NIB records should be replicated across different controller instances), (3) on how to distribute the data records between the secondary storage structures within one instance (e.g., which secondary storage records contain which records), (4) on how to distribute the data records between the secondary storage structures of different instances (e.g., which secondary storage records are replicated across different controller instances), (5) on how to distribute secondary storage instances across controller instances (e.g., whether to put a PTD, a DHT, or a Stats database instances within each controller or whether to put different subset of these storages within different instances), and (6) on how to replicate data records in the distributed secondary storage structures (e.g., whether to replicated PTD fully across all instances, whether to replicate some or all DHT records across more than one instance, etc.). The system also allows the coordination between the different controller instances as to the master control over different switching elements or different portions of the NIB to be configured differently. In some embodiments, some or all of these configurations can be specified by applications (e.g., a control application or a virtualization application) that run on top of the NOS.

In some embodiments, as noted above, the CMs of some embodiments facilitate intra-controller communication related to fault tolerance of controller instances. For instance, the CMs implement the intra-controller communication through the secondary storage layers described above. A controller instance in the control system may fail due to any number of reasons. (e.g., hardware failure, software failure, network failure, etc.). Different embodiments may use different techniques for determining whether a controller instance has failed. In some embodiments, Paxos protocols are used to determine whether a network control in the control system has failed. While some of these embodiments may use Apache Zookeeper to implement the Paxos protocols, other of these embodiments may implement Paxos protocols in other ways.

Some embodiments of the control system 500 may utilize defined timeouts to determine whether a controller instance has failed. For instance, if a controller instance in the control system does not respond to a polling message (e.g., send from another controller instance in the control system) within an amount of time (i.e., a defined timeout amount), the non-responsive controller instance is determined to have failed. Other techniques may be utilizes to determine whether a controller instance has failed in other embodiments.

When a controller instance fails, a new master for the logical data path sets and the switching elements, of which the failed controller instance was a master, needs to be determined. Some embodiments of the CM 520 make such determination by performing a master election process that elects a master controller instance. The CM 520 of some embodiments may perform a master election process for electing a new master controller instance for both the logical data path sets and the switching elements of which the failed controller instance was a master. However, the CM 520 of other embodiments may perform (1) a master election process for electing a new master controller instance for the logical data path sets of which the failed controller instance was a master and (2) another master election process for electing a new master controller instance for the switching elements of which the failed controller instance was a master. In these cases, the CM 520 may determine two different controller instances as new controller instances: one for the logical data path sets of which the failed controller instance was a master and another for the switching elements of which the failed controller instance was a master.

Some embodiments of the CM 520 not only perform the master election process when a controller instance fails, but also perform the master election process when the control system 500 detects a change in membership of the controller instances in the control system 500. For instance, the CM 520 may perform the master election process when the control system 500 detects that a new network controller has been added to the control system 500.

F. Controller Instance Architecture

Figure 6:
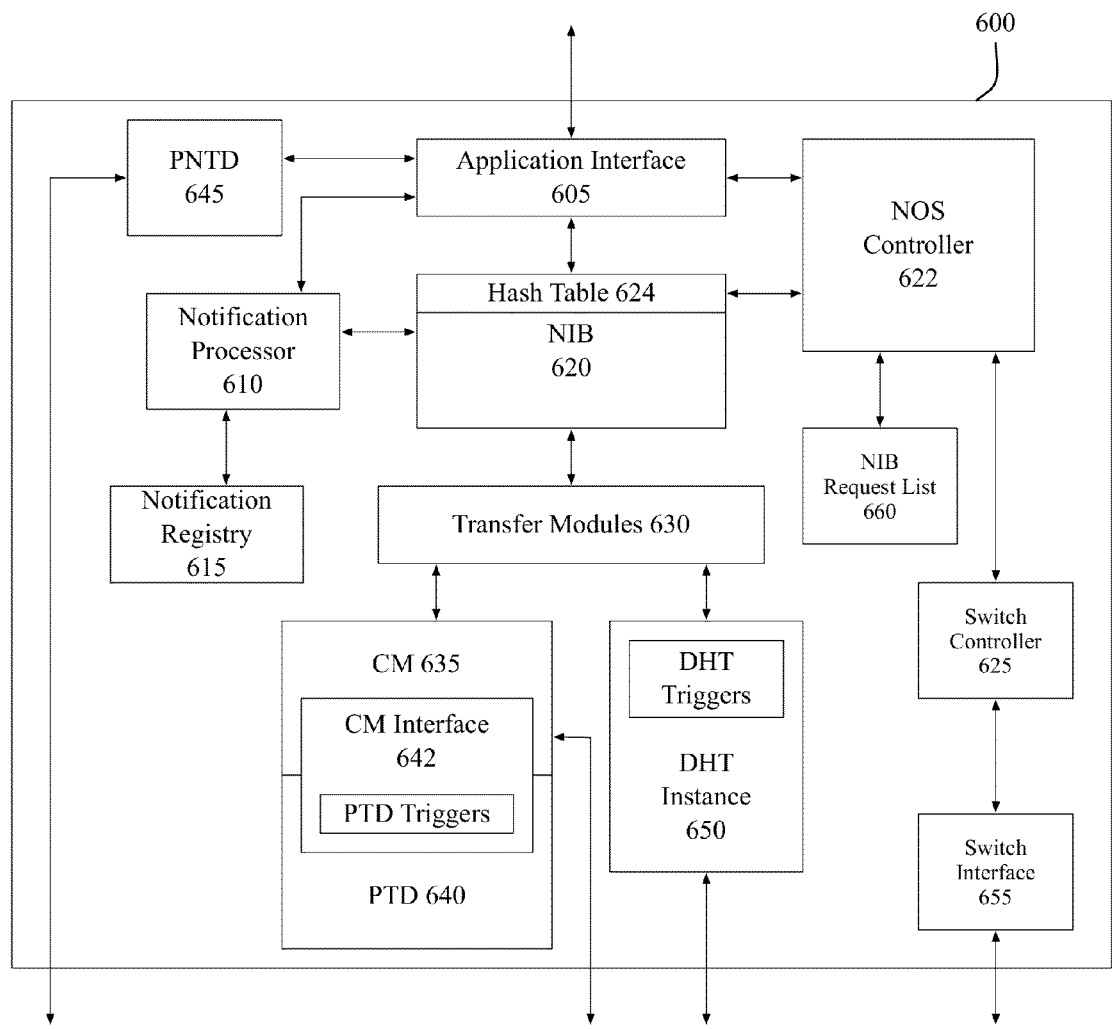
FIG. 6 conceptually illustrates a single NOS instance of some embodiments.

FIG. 6 conceptually illustrates a single NOS instance 600 of some embodiments. This instance can be used as a single NOS instance in the distributed control system 500 that employs multiple NOS instances in multiple controller instances. Alternatively, with slight modifications, this instance can be used as a single NOS instance in a centralized control system that utilizes only a single controller instance with a single NOS instance. The NOS instance 600 supports a wide range of control scenarios. For instance, in some embodiments, this instance allows an application running on top of it (e.g., a control or virtualization application) to customize the NIB data model and have control over the placement and consistency of each element of the network infrastructure.

Also, in some embodiments, the NOS instance 600 provides multiple methods for applications to gain access to network entities. For instance, in some embodiments, it maintains an index of all of its entities based on the entity identifier, allowing for direct querying of a specific entity. The NOS instance of some embodiments also supports registration for notifications on state changes or the addition/deletion of an entity. In some embodiments, the applications may further extend the querying capabilities by listening for notifications of entity arrival and maintaining their own indices. In some embodiments, the control for a typical application is fairly straightforward. It can register to be notified on some state change (e.g., the addition of new switches and ports), and once notified, it can manipulate the network state by modifying the NIB data tuple(s) (e.g., key-value pairs) of the affected entities.

As shown in FIG. 6, the NOS 600 includes an application interface 605, a notification processor 610, a notification registry 615, a NIB 620, a hash table 624, a NOS controller 622, a switch controller 625, transfer modules 630, a CM 635, a PTD 640, a CM interface 642, a PNTD 645, a DHT instance 650, switch interface 655, and NIB request list 660.

The application interface 605 is a conceptual illustration of the interface between the NOS and the applications (e.g., control and virtualization applications) that can run on top of the NOS. The interface 605 includes the NOS APIs that the applications (e.g., control or virtualization application) running on top of the NOS use to communicate with the NOS. In some embodiments, these communications include registrations for receiving notifications of certain changes in the NIB 620, queries to read certain NIB attributes, queries to write to certain NIB attributes, requests to create or destroy NIB entities, instructions for configuring the NOS instance (e.g., instructions regarding how to import or export state), requests to import or export entities on demand, and requests to synchronize NIB entities with switching elements or other NOS instances.

The switch interface 655 is a conceptual illustration of the interface between the NOS and the switching elements that run below the NOS instance 600. In some embodiments, the NOS accesses the switching elements by using the OpenFlow or OVS APIs provided by the switching elements. Accordingly, in some embodiments, the switch interface 655 includes the set of APIs provided by the OpenFlow and/or OVS protocols.

The NIB 620 is the data storage structure that stores data regarding the switching elements that the NOS instance 600 is controlling. In some embodiments, the NIB just stores data attributes regarding these switching elements, while in other embodiments, the NIB also stores data attributes for the logical data path sets defined by the user. Also, in some embodiments, the NIB is a hierarchical object data structure (such as the ones described above) in which some or all of the NIB objects not only include data attributes (e.g., data tuples regarding the switching elements) but also include functions to perform certain functionalities of the NIB. For these embodiments, one or more of the NOS functionalities that are shown in modular form in FIG. 6 are conceptual representations of the functions performed by the NIB objects. Several examples of these conceptual representations are provided below.

The hash table 624 is a table that stores a hash value for each NIB object and a reference to each NIB object. Specifically, each time an object is created in the NIB, the object's identifier is hashed to generate a hash value, and this hash value is stored in the hash table along with a reference (e.g., a pointer) to the object. The hash table 624 is used to quickly access an object in the NIB each time a data attribute or function of the object is requested (e.g., by an application or secondary storage). Upon receiving such requests, the NIB hashes the identifier of the requested object to generate a hash value, and then uses that hash value to quickly identify in the hash table a reference to the object in the NIB. In some cases, a request for a NIB object might not provide the identity of the NIB object but instead might be based on non-entity name keys (e.g., might be a request for all entities that have a particular port). For these cases, the NIB includes an iterator that iterates through all entities looking for the key specified in the request.

The notification processor 610 interacts with the application interface 605 to receive NIB notification registrations from applications running on top of the NOS and other modules of the NOS (e.g., such as an export module within the transfer modules 630). Upon receiving these registrations, the notification processor 610 stores notification requests in the notification registry 615 that identifies each requesting party and the NIB data tuple(s) that the requesting party is tracking.

As mentioned above, the system of some embodiments embeds in each NIB object a function for handling notification registrations for changes in the value(s) of that NIB object. For these embodiments, the notification processor 610 is a conceptual illustration of the amalgamation of all the NIB object notification functions. Other embodiments, however, do not provide notification functions in some or all of the NIB objects. The NOS of some of these embodiments therefore provides an actual separate module to serve as the notification processor for some or all of the NIB objects.

When some or all of the NIB objects have notification functions in some embodiments, the notification registry for such NIB objects are typically kept with the objects themselves. Accordingly, for some of these embodiments, the notification registry 615 is a conceptual illustration of the amalgamation of the different sets of registered requestors maintained by the NIB objects. Alternatively, when some or all of the NIB objects do not have notification functions and notification services are needed for these objects, some embodiments use a separate notification registry 615 for the notification processing module 610 to use to keep track of the notification requests for such objects.

The notification process serves as only one manner for accessing the data in the NIB. Other mechanisms are needed in some embodiments for accessing the NIB. For instance, the secondary storage structures (e.g., the PTD 640 and the DHT instance 650) also need to be able to import data from and export data to the NIB. For these operations, the NOS 600 uses the transfer modules 630 to exchange data between the NIB and the secondary storage structure.

In some embodiments, the transfer modules include a NIB import module and a NIB export module. These two modules in some embodiments are configured through the NOS controller 622, which processes configuration instructions that it receives through the interfaces 605 from the applications above the NOS. The NOS controller 622 also performs several other operations. As with the notification processor, some or all of the operations performed by the NOS controller are performed by one or more functions of NIB objects, in some of the embodiments that implement one or more of the NOS 600 operations through the NIB object functions. Accordingly, for these embodiments, the NOS controller 622 is a conceptual amalgamation of several NOS operations, some of which are performed by NIB object functions.

Other than configuration requests, the NOS controller 622 of some embodiments handles some of the other types of requests directed at the NOS instance 600. Examples of such other requests include queries to read certain NIB attributes, queries to write to certain NIB attributes, requests to create or destroy NIB entities, requests to import or export entities on demand, and requests to synchronize NIB entities with switching elements or other NOS instances.

In some embodiments, the NOS controller stores requests to change the NIB on the NIB request list 660. Like the notification registry, the NIB request list in some embodiments is a conceptual representation of a set of distributed requests that are stored in a distributed manner with the objects in the NIB. Alternatively, for embodiments in which some or all of the NIB objects do not maintain their modification requests locally, the request list is a separate list maintained by the NOS 600. The system of some of these embodiments that maintains the request list as a separate list, stores this list in the NIB in order to allow for its replication across the different controller instances through the PTD storage layer. This replication allows the distributed controller instances to process in a uniform manner a request that is received from an application operating on one of the controller instances.

Synchronization requests are used to maintain consistency in NIB data in some embodiments that employ multiple NIB instances in a distributed control system. For instance, in some embodiments, the NIB of some embodiments provides a mechanism to request and release exclusive access to the NIB data structure of the local instance. As such, an application running on top of the NOS instance(s) is only assured that no other thread is updating the NIB within the same controller instance; the application therefore needs to implement mechanisms external to the NIB to coordinate an effort with other controller instances to control access to the NIB. In some embodiments, this coordination is static and requires control logic involvement during failure conditions.

Also, in some embodiments, all NIB operations are asynchronous, meaning that updating a network entity only guarantees that the update will eventually be pushed to the corresponding switching element and/or other NOS instances. While this has the potential to simplify the application logic and make multiple modifications more efficient, often it is useful to know when an update has successfully completed. For instance, to minimize disruption to network traffic, the application logic of some embodiments requires the updating of forwarding state on multiple switches to happen in a particular order (to minimize, for example, packet drops). For this purpose, the API of some embodiments provides the synchronization request primitive that calls back one or more applications running on top of the NOS once the state has been pushed for an entity. After receiving the callback, the control application of some embodiments will then inspect the content of the NIB and determine whether its state is still as originally intended. Alternatively, in some embodiments, the control application can simply rely on NIB notifications to react to failures in modifications as they would react to any other network state changes.

The NOS controller 622 is also responsible for pushing the changes in its corresponding NIB to switching elements for which the NOS 600 is the master. To facilitate writing such data to the switching element, the NOS controller 622 uses the switch controller 625. It also uses the switch controller 625 to read values from a switching element. To access a switching element, the switch controller 625 uses the switch interface 655, which as mentioned above uses OpenFlow or OVS, or other known set of APIs in some embodiments.

Like the PTD and DHT storage structures 545 and 550 of the control system 500 of FIG. 5, the PTD and DHT storage structures 640 and 650 of FIG. 6 interface with the NIB and not the application layer. In other words, some embodiments only limit PTD and DHT layers to communicate between the NIB layer and these two storage layers, and to communicate between the PTD/DHT storages of one instance and PTD/DHT storages of other instances. Other embodiments, however, allow the application layer (e.g., the control application) within one instance to access the PTD and DHT storages directly or through the transfer modules 630. These embodiments might provide PTD and DHT access handles (e.g., APIs to DHT, PTD or CM interface) as part of the application interface 605, or might provide handles to the transfer modules that interact with the PTD layer (e.g., the CM interface 642) and DHT layers, so that the applications can directly interact with the PTD and DHT storage layers.

Also, like structures 545 and 550, the PTD 640 and DHT instance 650 have corresponding lists of triggers that are respectively maintained in the CM interface 642 and the DHT instance 650. Also, like the PNTD 555 of the control system 500, the PNTD 645 of FIG. 6 does not interface with the NIB 620. Instead, it interfaces with the application layer through the application interface 605. Through this interface, the applications running on top of the NOS can store data in and retrieve data from the PNTD. Also, applications of other controller instances can access the PNTD 645, as shown in FIG. 6. The above FIGS. 3-6 describe various aspects of a NOS of some embodiments. Other aspects and addition details of the NOS is further described in U.S. patent application Ser. No. 13/177,529, now issued as U.S. Pat. No. 8,743,889, entitled "Method and Apparatus for Using a Network Information Base to Control a Plurality of Shared Network Infrastructure Switching Elements," filed concurrently with this application.

II. Scaling and Reliability

Using a single NOS instance to control a network can lead to scaling and reliability issues. As the number of network elements increases, Central Processing Unit ("CPU") or memory that are required by those elements will saturate a single node. In one example, a single-instance application analyzing the statistics for all Ports in the NIB (e.g., for billing purposes) would only be able to dedicate one CPU second every two months to processing each Port. This section discusses the distribution framework NOS provides in some embodiments that enables control applications to scale to very large networks, and to increase their resilience to failure.

A. Scalability

In some embodiments, NOS provides support for three strategies a network control program can use to improve scaling. First, it allows control applications to partition the workload so that adding additional instances reduces work, without merely replicating it. Second, it allows for aggregation in which a cluster of NOS nodes appears as a single node in a separate cluster's NIB. This allows for federated and hierarchical structuring of NOS clusters, thus reducing the total amount of information required within a single NOS cluster. Finally, NOS provides applications with control over the consistency and durability of the network state. One of ordinary skill in the art will realize that the NOS of some embodiments may be implemented to support some or all of these features.

These three mechanisms available for the network control application to improve its scaling both in terms of CPU and memory resource usage will now be described.

Partitioning.

In some embodiments, the network control logic configures NOS so that a particular controller instance keeps only a subset of the NIB in memory and up-to-date. Further, one NOS instance of some embodiments has connections to only a subset of the network elements, and subsequently, can have less network events to process.

Aggregation.

In some embodiments, the control logic groups NOS instances together into sets. All instances within a set have complete access to the NIB entities representing network entities connected to those controllers. The set of instances then export aggregated information about its subset of the NIB to other NOS instances.

Consistency and Durability.

The control logic of some embodiments is able to dictate the consistency requirements for the network state it manages. In some embodiments, this is done by implementing any of the required distributed locking and consistency algorithms for state requiring strong consistency, and providing conflict detection and resolution for state not guaranteed to be consistent by use of these algorithms. In some embodiments, NOS provides two data stores that an application can use for state with differing preferences for durability and consistency. For state applications favor durability and stronger consistency, NOS of some embodiments offers a replicated transactional database and, for volatile state sustaining inconsistencies better, a memory based one-hop DHT.

In some embodiments, the above scalability mechanisms can be used alone or in combination. They can also be used to manage networks too large to be controlled by a single NOS instance. The following example will be used to demonstrate these mechanisms: a control logic that establishes paths between switches in a managed topology, with the goal of establishing complete routes through the network.

Partition.

In this example, a network is assumed to have a modest number of switches that can be easily handled by a single NOS instance. However, the number and size of all forwarding state entries on the network exceeds the memory resources of a single physical server.

To handle such a scenario, the control logic in this example replicates all switch state, partitions the forwarding state and assigns each partition to a unique NOS instance that is responsible for managing that state. Different methods can be used for partitioning as long as it creates relatively consistent chunks.

In some embodiments, the control logic records the switch and link inventory in the fully-replicated, durable state shared by all NOS instances, and it coordinates careful updates using the provided coordination mechanisms since that information changes slowly. However, information that is more volatile, such as link utilization levels, is stored in the DHT. Each controller of some embodiments uses the NIB's representation of the complete physical topology (e.g., from the replicated database), coupled with link utilization data (e.g., from the DHT), to configure tunnels as necessary to ensure paths meeting the deployment's requirements throughout the network.

The resulting distribution strategy in this example closely resembles how MPLS head-end routers are responsible for managing tunnels based on the link utilization information disseminated over intra-domain routing protocols.

Aggregate.

As the example network grows, partitioning the path management no longer suffices. At this point, the NOS instances and switches are still capable of handling the full mesh of connectivity between them, but the control logic cannot keep up with the utilization levels of all links anymore, due to CPU-intensive algorithms using this information to optimize the routes.

Thus, the control logic of some embodiments begins to aggregate the topology so that instances do not need to receive all link utilization information. In this example, the topology is divided into areas and aggregated information is used by instances that cannot afford to know all the details. NOS instances external to an area would know the exact physical topology within the area, but would retrieve only topologically aggregated link utilization information from the DHT generated by instances within that area.

In the topological aggregation sense, this approach converges to Asynchronous Transfer Mode Signaling Private Network-to-Network Interface (ATM PNNI) (as described in the ATM Forum entitled "Private Network-Network Interface Specification Version 1.1 (PNNI 1.1)" dated April 2002). The difference is that the NOS instances and switches still have full connectivity between them and it is assumed that the latency between any element (between the switches and NOS instances or between NOS instances) is not a problem.

Partition Further.

Eventually the switches and NOS instances cannot be assumed to have full connectivity due to capacity of switches or NOS instances. It is assumed in this example that the distributing physical topology of the whole network among NOS instances is not an issue because new physical links and network elements are deployed and old ones removed at relatively low rates.

At this point, control logic instances still rely on aggregating the link utilization information, but it now uses the inter-NOS state distribution mechanisms to intermediate requests to switches in remote areas; they do this by adding an attribute to the corresponding entity object in the NIB and waiting until the NOS instances in the remote area respond through another attribute. In some embodiments, the "request" and "response" are relayed between the areas using the DHT. Because this transfer might happen via a third NOS instance, any control logic that needs faster response times may configure DHT key ranges for areas and use DHT keys such that the modified entity attributes are stored to within the proper area.

This approach scales to wide-area networks. For example, areas could represent Point-of-Presences as well as different parts of the backbone network. In some embodiments, it is feasible to have both distributed and centralized control over the established flows: areas could independently establish flows from themselves to other areas, but areas could also assume a centralized control logic responsible for determining which tunnels to establish between areas. The distributed approach of some embodiments would be almost directly equivalent to PNNI (with the exception that learning the physical topology of a remote area would be at the discretion of the areas themselves) and similar to hierarchical MPLS (with the exception that some topology information is shared across areas).

Inter-Domain Aggregation.

In some embodiments, once the controlled network spans two separate ASes (Autonomous System), sharing full topology information among the NOS instances becomes unfeasible due to privacy reasons and the control logic designer needs to adapt the design again to changed requirements.

The platform of some embodiments does not dictate how the ASes would peer, but at a high-level they would have two requirements to fulfill: (1) sharing their topologies at some level of detail (while preserving privacy) with their peers, and (2) establishing paths for each other proactively (according to a peering contract) or on-demand, and exchanging their ingress information.

B. Reliability

In some embodiments, the control logic prepares for four kinds of failures in the network: network element failures, link failures, NOS instance failures, and failures in connectivity between network elements and NOS instances, as well as between NOS instances. This subsection discusses each in turn.

Network Element and Link Failures.

Network element and link failures are failure types that modern control planes already handle, and the same mechanisms apply for the control logic built on NOS. When a network element or link fails, the control logic of some embodiments steer traffic around the failures. In some embodiments, the dissemination times of the failures through the network together with the re-computation of the forwarding tables define the minimum time for reacting to the failures. Given the increasingly stringent requirements for the quality of the provided connectivity, the control planes of some embodiments prepare for failures by installing backup paths (or applying similar measures) that can be installed quickly once a failure occurs.

In some embodiments, NOS assumes this kind of pre-computation for reacting to the network element and link failures for control logic. With this assumption, the cost of using a DHT to disseminate failure information rather than is less than that of using the traditional flooding method. To further optimize reaction time and minimize induced load for NOS, the network elements of some embodiments can implement link and path monitoring on behalf of NOS, and independently switch to backup paths when failures are detected.

NOS Failures.

To handle an NOS instance failure, the control logic of some embodiments has two options: one option is to have other instances detect the failure and takeover the responsibilities of the failed instance quickly, or alternatively, having more than one instance simultaneously manage each network element. Which approach an application prefers depends on its desired trade-off between reliability and cost, both in design complexity and run-time monitoring.

For detecting and reacting to NOS instance failures, the NOS of some embodiments provides the coordination facilities discussed in Section III.

To simultaneously manage a network element by more than one NOS instance, the control logic of some embodiments are prepared for multiple instances modifying, and possibly overwriting changes to, the element state. In some embodiments, NOS provides hooks that control logic can use to determine whether conflicting changes made by other instances to the network element can be overridden. As long as the control logic computes the same network element state in a deterministic fashion at each NOS instance, the state can remain inconsistent only transiently. At the high-level, this approach is similar to the reliability mechanisms of RCP, in which multiple centralized controllers push updates over iBGP to edge routers.

Connectivity Infrastructure Failures.

In some embodiments, NOS state distribution mechanisms decouple themselves from the underlying topology, and as such, expect the connectivity to recover from failures, both between network elements and NOS instances as well as between NOS instances. The preferred solution depends on the network environment.

In some embodiments, in the network environments in which NOS is used, the control network is separate and completely isolated from the managed network dedicated to production traffic. In these environments, NOS simply uses the control network for its interconnections and assume the dedicated control network is well-tuned to provide low convergence times, minimizing disruptions in connectivity due to failures within the control network.

Even when the environment does not provide a separate control network, the physical network topology is typically known to NOS. Therefore, the control logic of some embodiments can populate network elements with static forwarding state to be used by a network-level source routing protocol implemented below NOS in the protocol stacks. In some embodiments, this, combined with multi-pathing (also implemented below NOS) guarantee reliable connectivity to the managed network elements, as well as between NOS instances.

III. Distributing the NIB

This section describes how NOS of some embodiments distributes its Network Information Base and what semantics an application can expect from it.

In some embodiments, NOS state distribution mechanisms follow two observations about practical network management applications. First, in addition to the size of the network affecting the volume of the network state updates, different types of the network state have inherently different efficiency and durability requirements, depending on the application. Network policy declarations and physical network element inventories are perfect examples of relatively slowly-changing network state that are likely to require more durability than update speed, whereas link load information is an example of rapidly-changing network state that is more transient in nature. Second, different applications have varying preferences for the consistency of the network state they manage. Link state information and network policy configurations are examples of the extreme ends: transiently-inconsistent up/down status bits of adjacent links are likely to be easier for an application to resolve than an inconsistency in a network-wide policy declaration.

The NOS of some embodiments exploits the first observation by having two separate mechanisms for distributing network state updates between NOS instances: one designed for high update rates with guaranteed availability, and one designed with durability and consistency in mind. Following the example of many distributed storage systems that allow applications to make performance/scalability tradeoffs, the NOS of some embodiments makes application designers responsible for explicitly determining their preferred mechanism for any given state in the NIB. The NOS of some embodiments also allows the application designers to opt not to use either one, and use the NIB simply as storage for local state. Furthermore, in some embodiments, NOS supports arbitrary storage systems when applications write their own import/export modules, which transfer data from a storage system to the NIB and use the NIB notification API to transfer data back to the storage system.

In solving the applications' preference for differing consistency requirements, the NOS of some embodiments relies on their help: it expects the applications to use the provided coordination facilities to implement distributed locking or consensus protocols as needed. In some embodiments, the platform also expects the applications to provide the implementation for handling any inconsistencies arising between updates, when they are not using strict data consistency. While applications are given the responsibility to implement the inconsistency handling, in some embodiments, NOS provides a programmatic framework assisting the applications in doing so.

Thus, application designers are free to determine the trade-off between potentially simplified application architectures (promoting consistency and durability) and more efficient operations (with the cost of increased complexity).

The state distribution between NOS instances will now be discussed in more detail, as well as how the NOS of some embodiments integrates switches and their state into these distribution mechanisms, before returning to how the NOS of some embodiments gives the applications control over consistency aspects.

A. State Distribution Between NOS Instances

In some embodiments, NOS separates the state distribution mechanisms used between NOS instances from the mechanisms used between NOS instances and switches. This separation allows for different design trade-offs between the two: network element state management mechanisms can be designed with simplicity in mind, whereas the mechanisms used between NOS instances can favor generality. This reflects the fact that physical network elements are embedded systems, potentially coming in a variety of hardware architectures (each requiring porting efforts), and they do not necessarily have the computing and storage resources of the server hardware.

The NOS of some embodiments implements a transactional persistent database backed by a replicated state machine for disseminating all state updates requiring durability and easier consistency management. The replicated database comes with severe performance limitations, and as such, the database is designed to serve only as a reliable dissemination mechanism for network state with low churn rate. In some embodiments, the transactional database provides a flexible SQL-based querying API together with rich data models for applications to use directly, if preferred.

To integrate the replicated database to the NIB, the NOS of some embodiments includes import/export modules that interact with the database. These components load and store entity declarations and their attributes from and to the transactional database. Applications can easily group NIB modifications together into a single transaction to be exported to the database. In some embodiments, when the import module receives a trigger invocation from the database about changed database contents, it applies the changes to the NIB.

For network state needing high update rates and availability, the NOS of some embodiments provides a one-hop, eventually-consistent, memory-only DHT (similar to Dynamo (as described in the proceedings of the October 2007 SOSP symposium entitled "Dynamo: Amazon's Highly Available Key-value Store" by DeCandia, G., Hastorun, D., Jampani, M., Kakulapati, G., Lakshman, A., Pilchin, A., Silvasubramanian, S., Vosshall, P., and Vogels, W.)), relaxing the consistency and durability guarantees provided by the replicated database. In addition to the common get/put API, the DHT of some embodiments provides soft-state triggers: the application can register to receive a callback when a particular value gets updated, after which the trigger must be reinstalled. In some embodiments, false positives are also allowed to simplify the implementation of the DHT replication mechanism. The DHT of some embodiments manages its membership state and assigns key-range responsibilities using the same coordination mechanisms provided for applications.

When a particular piece of data stored in the DHT is updated at several different NOS instances, the fact that the DHT is not a transactional storage layer can lead to more prevalent data inconsistencies than seen in data stored in the replicated database. Furthermore, the very introduction of a second storage system may cause further NIB inconsistencies. In some embodiments, the NOS DHT returns multiple values for a given key in the same manner as Dynamo when it has been inconsistently updated, and the application can specify how to reconcile these values.

B. Network Element Integration

In some embodiments, NOS instances can integrate network elements to the NIB using several protocols, so that the ones preferred in a particular network environment can be used. In some embodiments, protocols are hidden from the applications by the NIB, and hence, replacing the protocol or supporting multiple similar protocols in parallel do not require changing applications. The most common protocols of some embodiments will now be discussed.

One common protocol is OpenFlow (as described in SIGCOMM's CCR 38, 2 entitled "OpenFlow: Enabling Innovation in Campus Network" dated 2008 by McKeown, N., Anderson, T., Balakrishnan, H., Parulkar, G., Peterson, L., Rexford, J., Shenker, S., and Turner, J.). OpenFlow provides a performance-optimized channel to the switches for managing forwarding tables and quickly learning port status changes, which may have an impact on reachability within the network. In some embodiments, the OpenFlow events and operations are turned into state that is stored in the NIB entities. For instance, when an application adds a flow entry to a ForwardingTable entity in the NIB, the OpenFlow export component will translate that into an OpenFlow operation that adds the entry to the switch TCAM. Similarly, the TCAM entries are accessible to the application in the contents of the ForwardingTable entity.

For managing and accessing general switch configuration and status information, an NOS instance of some embodiments can opt to connect to a switch over a configuration database protocol (such as the one supported by Open vSwitch (as described in the proceedings of the October 2009 HotNets entitled "Extending Networking into the Virtualization Layer" by Pfaff, B., Pettit, J., Koponen, T., Amidon, K., Casado, M., and Shenker, S.)). Typically this database interface exposes the switch internals that OpenFlow does not. For some embodiments of NOS, the protocol provides a mechanism to receive a stream of switch state updates, as well as to push changes to the switch state. In some embodiments, the low-level semantics of the protocol closely resembles the transactional database (used between controllers) discussed above, but instead of requiring full SQL support from the switches, the database interface has a more restricted query language that does not provide joins.

Similar to the integration with OpenFlow, the NOS of some embodiments provides convenient, data-oriented access to the switch configuration state by mapping the switch database contents to NIB entities that can be read and modified by the applications. For example, by creating and attaching Port entities with proper attributes to a ForwardingEngine entity, which corresponds to a single switch datapath, applications can configure new tunnel endpoints without knowing that this translates to an update transaction sent to the corresponding switch.

C. Consistency and Coordination

In some embodiments, the NIB is the central integration point for multiple data sources (other NOS instances as well as connected switches); that is, the state distribution mechanisms do not interact directly with each other, but the import and export components corresponding to the data sources integrate only to the NIB. To support varying applications possibly with very different scalability and reliability requirements, the NOS of some embodiments expects the applications to declare what data should be imported and exported to and from a particular data source. Applications do this by directly configuring import/export modules.

In some embodiments, the NIB integrates the data sources without imposing strong consistency on them, and as a result, the state updates to be imported into NIB may be inconsistent either due to the inconsistency of state within an individual data source (DHT) or due to inconsistencies between data sources. To this end, the NOS of some embodiments expects the applications to provide assistance and to register inconsistency resolution logic with the platform. Applications have two means to do so. In some embodiments, entities in NOS are C++ classes that the application may extend, and thus, applications are expected to simply use inheritance to embed referential inconsistency detection logic into entities so that applications are not exposed to inconsistent state due to invalid references between entities in the NIB. In some other embodiments, the plugins that the applications pass to the import/export components implement conflict resolution logic, allowing the import modules to know how to resolve situations where both the local NIB and the data source have changes for the same state. One of ordinary skill in the art will realize that these two means may be used alone or in combination.

For example, consider a new Node N, imported into the NIB from the replicated database. If N contains a reference in its list of ports to Port P that has not yet been imported, the application of some embodiments might prefer that N not expose a reference to P to the control logic until P has been properly imported. Furthermore, in some embodiments, when the application is using the DHT to store statistics about the number of packets forwarded by N, it is possible for the import module of an NOS instance to retrieve two different values for this number from the DHT. In some embodiments, the application's conflict resolution logic may reconcile these values, storing only one into the NIB and back out to the DHT.

This leaves the application with a consistent topology data model. However, the application still needs to react to NOS instance failures and use the coordination mechanisms provided to determine which instances are responsible for different portions of the NIB and then instruct the import and export components to adjust their behavior as the responsibilities within the cluster shift.

For coordination, the NOS of some embodiments embeds Zookeeper (as described in the proceedings of the June 2010

Usenix Annual Technical Conference entitled "ZooKeeper: Wait-free Coordination for Internet-Scale Systems" by Hunt, P., Konar, M., Junqueira, F. P., and Reed, B.) and provides applications with an object-oriented API to its filesystem-like hierarchical namespace, convenient for realizing distributed algorithms for consensus, group membership, and failure detection. While some applications may prefer to use Zookeeper's services directly to store persistent configuration state instead of the transactional database, others may prefer to use transactional database due to the object size limitations of Zookeeper and convenience of accessing the configuration state directly through the NIB.

IV. Framework

In some embodiments, NOS integrates a number of third party libraries including Cassandra and Zookeeper. At its simplest, NOS is a harness which contains logic for communicating with the network elements, aggregating that information into the NIB, and providing a framework in which application programmers can write a network control logic.

This section briefly discusses the programmatic framework developed in which application programmers must work, focusing on the concurrency model and component framework.

In some embodiments, a single NOS instance can run across multiple processes, each implemented using a different programming language. Processes are interconnected using the same RPC system that NOS instances can use among themselves, but instead of running over TCP/IP it runs over local IPC connections. In this model, supporting a new programming language becomes a matter of writing a few thousand lines of integration code, typically in the new language itself. NOS of some embodiments supports C++, Python, and Java. The latter two are especially useful in integrating with external management systems requiring complicated protocols that are not performance critical.

In some embodiments, regardless of the programming language, all software modules in NOS are written as loosely-coupled components, which can be replaced with others without recompiling NOS as long as the component's interface remains the same. Components can be loaded and unloaded dynamically and designers can express dependencies between components to ensure they are loaded in the proper order.

In the main C++ process, a threading library is used in some embodiments to free developers from manual stack management without introducing the challenges of the pre-emptive threading. However, to exploit multi-core CPUs, the library may enable developers to mix pre-emptive threading code with cooperative threading.

V. Use Cases

Some applications that are built on top of some embodiments of NOS will now be discussed.

A. Ethane

For enterprise networks, a network management application is built to enforce network security policies. Using Flow-based Management Language (FML), (as described in the proceedings of the August 2009 SIGCOMM's Workshop: Research on Enterprise Networking (WREN) entitled "Practical Declarative Network Management" by Hinrichs, T. L., Gude, N. S., Casado, M., Mitchell, J. C., and Shenker, S.), network administrators can declare security policies in a centralized fashion using high-level names instead of network level addresses and identifiers. The application processes the first packet of every flow obtained from the first hop switch: it tracks hosts' current locations, applies the security policies, and when the flow is approved, sets up the forwarding state for the flow through the network to the destination host. In some embodiments, the link state of the network is discovered through LLDP messages sent by NOS instances as each switch connects.

In some embodiments, when the aggregate flow traffic of a large network exceeds the capacity of a single server, multiple NOS instances are used to partition the flow processing for large-scale deployment. Further, having NOS on the flow-setup path makes failover between multiple instances particularly important.

Partitioning the flow-processing state requires that all controllers be able to setup paths in the network, end to end. Therefore, each NOS instance of some embodiments needs to know the location of all end-points as well as the link state of the network. However, the system will not fail even when this information is not strongly consistent between controllers. At worst, a flow is routed to an old location of the host over a failed link. It is also unnecessary for the link state to be persistent, since this information is obtained dynamically. Therefore, the controllers can use the DHT for storing link-state that allows tens of thousands of updates per second (see Section VI.a).

B. Distributed Virtual Switch (DVS)

In virtualized enterprise network environments, the network edge comprises virtual, software-based L2 switch appliances within hypervisors instead of physical network switches. Virtual deployments, especially in cloud-hosting providers, can comprise tens of VMs per server, and have a total of hundreds, thousands or tens of thousands of VMs. These environments can also be highly dynamic, such that VMs are added, deleted and migrated on the fly.

To cope with such environments, the concept of a distributed virtual switch (DVS) has arisen (as described in VMWare vNetwork Distributed Switch, Simplify Virtual Machine Networking, http://vmware.com/products/vnetwork-distributed-switch). A DVS provides a logical switch abstraction over which policies (e.g., policing, QoS, ACLS) are declared over the logical switch ports. These ports are bound to virtual machines through integration with the hypervisor. As the machines come and go and move around the network, the DVS ensures that the policies follow the VMs and therefore do not have to be reconfigured manually.

Thus, when operating with a DVS application, the NOS of some embodiments is not involved in datapath flow setup, but only invoked when VMs are created, destroyed, or migrated. Hypervisors are organized as pools comprising a reasonably small number of hypervisors and VMs typically do not migrate across pools; and therefore, the control logic can easily partition itself according to the pools. In some embodiments, a single NOS instance then handles all the hypervisors of a single pool. All the switch configuration state is persisted to the transactional database, whereas all VM locations are not shared between NOS instances.

When an NOS instance goes down, the network can still operate. However, VM dynamics will no longer be allowed. Therefore, high availability in such an environment is less critical than in the Ethane environment described previously, in which an NOS crash would render the network inoperable to new flows. In our DVS application, reliability is achieved through a cold standby prepared to boot in a failure condition.

C. Multi-Tenant Virtualized Data Centers

The problems described in the previous section are exacerbated in multi-tenant environments. The problem statement is similar, however: in addition to handling end-host dynamics, the network must also enforce both addressing and resource isolation between tenant networks. Tenant networks may have, for example, overlapping MAC or IP addresses, and may run over the same physical infrastructure.

In some embodiments, an application on top of NOS can be developed which allows the creation of tenant-specific L2 networks. These networks provide a standard Ethernet service model and can be configured independently of each other and can span physical network subnets.

The control logic of some embodiments isolates tenant networks by encapsulating tenant's packets at the edge, before they enter the physical network, and decapsulating them when they either enter another hypervisor or are released to the Internet. For each tenant virtual network, the control logic establishes tunnels pair-wise between all the hypervisors running VMs attached to the tenant virtual network. As a result, the number of required tunnels is O(N2), and thus, with potentially tens of thousands of VMs per tenant network, the state for just tunnels may grow beyond the capacity of a single NOS instance, not to mention that the switch connections can be equally numerous.

Therefore, the control logic of some embodiments partitions the tenant network so that multiple NOS instances share responsibility for the network. In some embodiments, a single NOS instance manages only a subset of hypervisors, but publishes the tunnel end-point information over DHT so any other instances needing to setup a tunnel can configure the DHT import module to fetch the relevant information into the NIB. The tunnels themselves are stateless, and thus, multiple sending hypervisors can share a single receiving tunnel endpoint.

D. Scale-Out Carrier-Grade IP Router

A scale-out BGP router can be developed using commodity switching components as the forwarding plane.

In this application, the NOS of some embodiments provides the "glue" between the physical hardware (a collection of commodity switches) and the control plane (an open source BGP stack). In this example, the NOS is responsible for aggregating the disparate hardware devices and presenting them to the control logic as a single forwarding plane, comprising an L2/L3 table, and a set of ports. NOS is also responsible for translating the RIB, as calculated by the BGP stack, into flow entries across the cluster of commodity switches.

In some embodiments, NOS provides the logic to build a scale-out chassis from the switches. The backplane of the chassis is realized through the use of multiple connections and multi-pathing between the switches, and individual switches act as line-cards. When a single switch fails, NOS alerts the routing stack that the associated ports on the full chassis have gone offline. However, this should not affect the other switches within the cluster.

In some embodiments, the control traffic from the network (e.g., BGP or IGP traffic) is forwarded from the switches to NOS, which annotates it with the correct logical switch port and forwards it to the routing stack. Because only a handful of switches are used, the memory and processing demands of this application are relatively modest. A single NOS instance with an active failover (in which the hardware configuration state is persistent) is sufficient for even very large deployments.

VI. Micro-Benchmarks

In this section, a set of micro-benchmarks that help describe NOS' scalability and reliability will be presented.

A. Scalability

Single-Node Performance.

Three key scalability-related aspects of a single NOS instance is benchmarked: throughput of the NIB, memory usage of the NIB, and bandwidth in the presence of many connections.

The NIB is the focal point of the API, and the performance of an application will depend on the capacity the NIB has for processing updates and notifying listeners. To measure this throughput, a micro-benchmark is run where an application repeatedly acquired exclusive access to the NIB (by its cooperative thread acquiring the CPU), modified integer attribute (s) of an entity (which triggers immediate notification of any listening export modules), and then releasing NIB access. In this test, none of the export modules acted on the notifications of NIB changes they received. With only a single attribute modification, this micro-benchmark essentially becomes a benchmark for the threading library, as acquiring exclusive access to the NIB translates to a context switch. As the number of modified attributes between context switches increases, the effective throughput increases because the modifications involve only a short, fine-tuned code path through the NIB to the export modules.

NOS NIB entities provide convenient state access for the application as well as for import and export modules. In some embodiments, the NIB handles a large number of entries without undue excessive usage. Each attribute in this test is 16 bytes (on average), with an 8-byte attribute identifier (plus C++ string overhead); in addition, NOS uses a map to store attributes (for indexing purposes) that reserves memory in discrete chunks. A zero-attribute entity, including the overhead of storing and indexing it in the NIB, consumes 191 bytes. The results suggest a single NOS instance (on a server-grade machine) can easily handle networks of millions of entities. As entities include more attributes, their sizes increase proportionally.

Each NOS instance has to connect to the switches it manages. To stress this interface, (software) switch cloud is connected to a single NOS instance and ran an application that, after receiving a 64-byte packet from a switch, made a forwarding decision without updating the switch's forwarding tables. That is, the application sent the packet back to the switch with forwarding directions for that packet alone. Because of the application's simplicity, the test effectively benchmarks the performance of our OpenFlow stack, which has the same code path for both packets and network events (such as port events).

Multi-Node Performance.

In some embodiments, NOS instances use three mechanisms to cooperate: two state update dissemination mechanisms (the DHT and the replicated, transactional database) and the Zookeeper coordination mechanism. Zookeeper's performance has been studied elsewhere, so the DHT and replicated database will be discussed in more detail.

The throughput of our memory-based DHT is effectively limited by the NOS RPC stack. The DHT performance can then be seen as the RPC performance divided by the replication factor. While a single value update may result in both a notification call and subsequent get calls from each NOS instance having an interest in the value, the high RPC throughput still shows our DHT to be capable of handling very dynamic network state. For example, if it is assumed that an application fully replicates the NIB to five NOS instances, then each NIB update will result in 22 RPC request-response pairs (2 to put the new value to both replicas, 2*5 to notify all instances of the update, and 2*5 for all instances to fetch the new value from both replicas and reinstall their triggers). Given the results, this implies that the application, in aggregate, can handle 24,000 small DHT value updates per second. In a real deployment this might translate, for example, to updating a load attribute on 24,000 link entities every second—a fairly ambitious scale for any physical network that is controlled by just five NOS instances. Applications can use aggregation and NIB partitioning to scale further.

The replicated transactional database is not optimized for throughput, and in fact is currently limited by its partially Python-based implementation. However, its performance has not yet become a bottleneck due to the relatively static nature of the data it stores. If the application stores its port inventory in the replicated database, for example, without any batching it can process 17 port additions and removals per second, along with about 6.5 queries per second from each node about the existence of ports (17+6.5*5~49.7).

B. Reliability

A primary consideration for production deployments is reliability to failure. The three types of failure a control application needs to handle are now described: link failures, switch failures, and NOS instance failures.

Link and Switch Failures.

In some embodiments, NOS instances monitor their connections to switches using aggressive keepalives. Similarly, switches monitor their links (and tunnels) using hardware based probing. Both of these can be fine-tuned to meet application requirements.

Once a link or switch failure is reported to the control application, the latencies involved in disseminating the failure-related state updates throughout the NOS cluster become essential; they define the absolute minimum time the control application will take to react to the failure throughout the network.

However, once the controllers are more distant from each other in the network, the DHT's pull-based approach begins to introduce additional latencies compared to the ideal push-based methods common in distributed network protocols today. Also, the new value being put to the DHT may be placed on an NOS instance not on the physical path between the instance updating the value and the one interested in the new value. Thus, in the worst case, a state update may take four times as long as it takes to push the value (one hop to put the new value, one to notify an interested NOS instance, and two to get the new value).

In practice, however, this overhead tends not to impact network performance, because practical availability requirements for production traffic require the control application to prepare for switch and link failures proactively by using backup paths.

NOS Instance Failures.

The application has to detect failed NOS instances and then reconfigure responsibilities within the NOS cluster. For this, applications rely on the Zookeeper coordination facilities provided by NOS.

As apparent from the above discussion, some embodiments of the invention use the control platform to simplify network control implementations. Rather than forcing developers to deal directly with the details of the physical infrastructure, the control platform handles the lower-level issues and allows developers to program their control logic on a high-level API. In so doing, the NOS of some embodiments essentially turns networking problems into distributed systems problem, resolvable by concepts and paradigms familiar for distributed systems developers.

VII. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
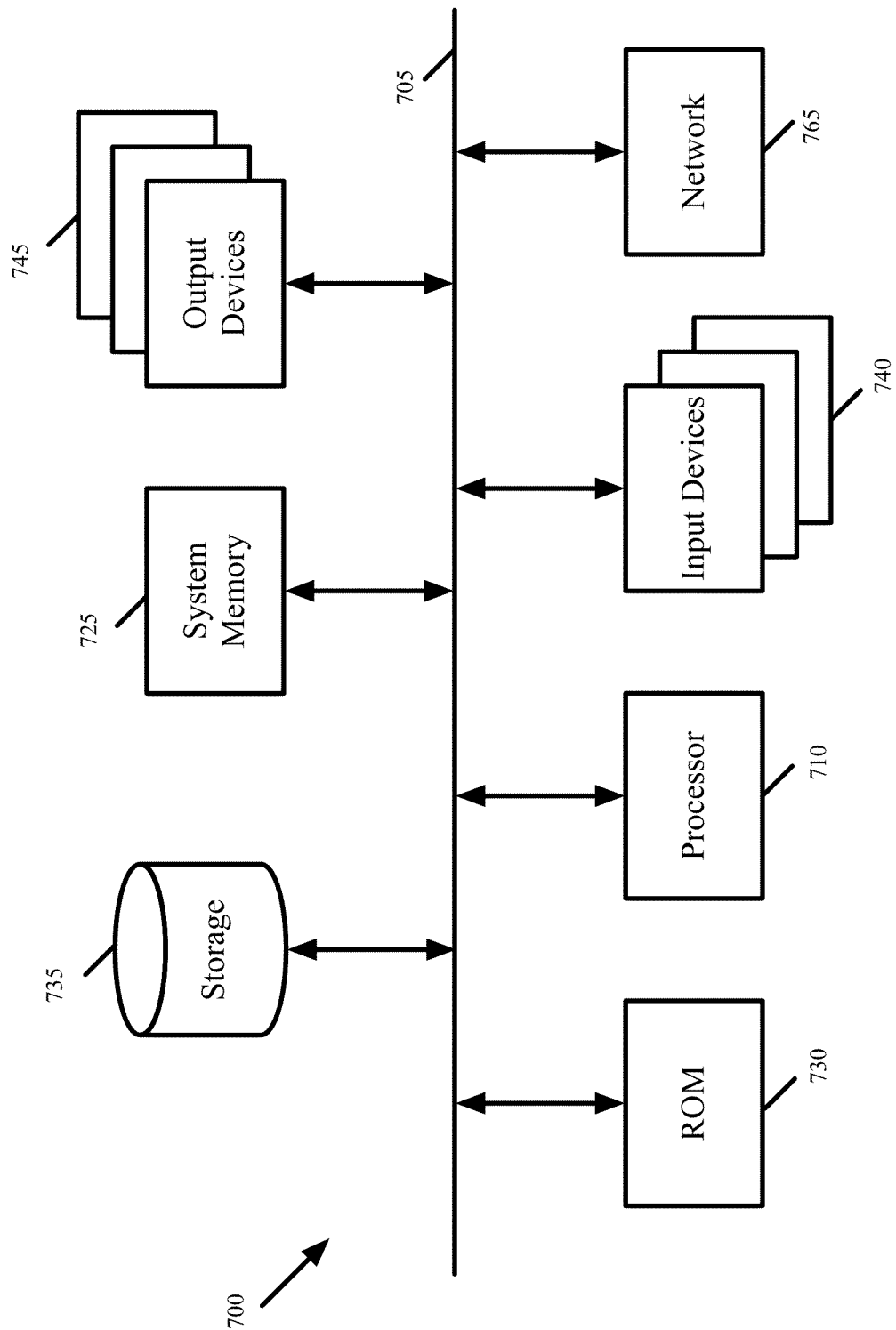
FIG. 7 conceptually illustrates an electronic system with which some embodiments of the invention are implemented.

FIG. 7 conceptually illustrates an electronic system 700 with which some embodiments of the invention are implemented. The electronic system 700 can be used to execute any of the control, virtualization, or operating system applications described above. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random access memory. The system memory stores some of the instructions and data that the processor needs at runtime. In some embodiments, the invention's processes are stored in the system memory 725, the permanent storage device 735, and/or the read-only memory 730. For example, the various memory units include instructions for processing multimedia clips in accordance with some embodiments. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details.

We claim:

1. A non-transitory machine readable medium storing a program executable by at least one processing unit, the program comprising sets of instructions for:
    monitoring a plurality of network controllers for managing a plurality of managed switching elements, the plurality of network controllers comprising a first network controller for (i) defining a logical data path set (LDPS) in terms of logical forwarding plane (LFP) data that specifies logical forwarding operations of a logical switching element that implements the LDPS and (ii) converting the LFP data to physical control plane (PCP) data for supplying to a set of managed switching elements across which the LDPS is implemented;
    detecting that the first network controller in the plurality of network controllers has failed; and
    selecting a second network controller in the plurality of network controllers to perform operations of the first network controller for the LDPS.

2. The non-transitory machine readable medium of claim 1, wherein the first network controller defines the LDPS in terms of the LFP data by receiving logical control plane (LCP) data that specifies the LDPS and converting the LCP data to LFP data.

3. The non-transitory machine readable medium of claim 1, wherein a managed switching element that receives the PCP data converts the PCP data into physical forwarding plane data that specifies a forwarding behavior of the managed switching element.

4. The non-transitory machine readable medium of claim 1, wherein the first network controller allows a user to configure the logical switching element without configuring the managed switching elements.

5. The non-transitory machine readable medium of claim 1, wherein the set of instructions for detecting comprises a set of instructions for determining that the first network controller has failed when a response to a polling message from the first network controller is not received within a defined amount of time.

6. For a particular network controller of a plurality of network controllers for managing a plurality of managed switching elements that forward data in a network, a method comprising:
    monitoring the plurality of network controllers comprising a first network controller for expressing a logical forwarding plane (LFP) of a logical data path set (LDPS), said LFP comprising a logical L2 forwarding table that specifies logical L2 forwarding operations of a logical switch that is defined by the LDPS and is implemented across a set of managed switching elements;
    detecting that the first network controller in the plurality of network controllers has failed; and
    selecting a second network controller in the plurality of network controllers to perform operations of the first network controller for the LDPS.

7. The method of claim 6, wherein the first network controller expresses the LFP of the LDPS by receiving logical control plane (LCP) data that specifies the LDPS and converting the LCP data to LFP data.

8. The method of claim 7, wherein the first network controller converts the LFP data to physical control plane (PCP) data for supplying to the plurality of managed switching elements across which the logical switch is implemented.

9. The method of claim 8, wherein the first network controller sends the PCP data to a third network controller in the plurality of network controllers and the third network controller supplies the PCP data to a set of managed switching elements that implements at least a portion of said logical switch.

10. The method of claim 9, wherein the third network controller is the only controller that is configured to send the PCP data to the set of managed switching elements.

11. For a network control system that manages a plurality of managed forwarding elements that forward data within a network, a method for managing the plurality of managed forwarding elements comprising:

grouping the plurality of managed forwarding elements into sets of managed forwarding elements;

instantiating a plurality of network operating system (NOS) instances and configuring each of the NOS instances to maintain forwarding state information of one set of the sets of managed forwarding elements; and configuring each NOS instance of the plurality of NOS instances to collect the maintained forwarding state information for the one set of managed forwarding elements and exchange the maintained forwarding state information with the rest of the plurality of NOS instances.

12. The method of claim 11 further comprising managing the plurality of managed forwarding elements using an initial NOS instance that maintains forwarding state information of the plurality of managed forwarding elements, wherein the network control system performs said grouping, instantiating, and configuring when an amount of the forwarding state information that the initial NOS instance maintains exceeds a threshold amount for the initial NOS instance to maintain.

13. The method of claim 12, wherein the threshold amount of information that the initial NOS instance is to maintain is exceeded when memory resources that the initial NOS instance uses run out.

14. The method of claim 11 further comprising, when an amount of the forwarding state information obtained by each NOS instance of the plurality of NOS instances from other NOS instances of the plurality of NOS instances exceeds a threshold amount for the NOS instance to handle, configuring at least one particular NOS instance of the plurality of NOS instances (i) to reduce the forwarding state information of the set of managed forwarding elements maintained by the particular NOS instance and (ii) to present the reduced forwarding state information to another NOS instance of the plurality of NOS instances.

15. The method of claim 14,
wherein each managed forwarding element in the plurality of managed forwarding elements has a link established to at least one of the other managed forwarding elements in the plurality of managed forwarding elements, wherein the forwarding state information of the plurality of managed forwarding elements includes link utilization information for each link of the links, wherein the particular NOS instance reduces the forwarding state information by aggregating link utilization information for the links of the managed forwarding elements of which the particular NOS instance maintains the forwarding state information.

16. The method of claim 14, wherein the threshold amount of information that each of the plurality of NOS instances is to handle is exceeded when central processing unit (CPU) resources that the NOS instance uses reach a full capacity to process the information.

17. The method of claim 11, wherein each managed forwarding element in the plurality of managed forwarding elements has a link established to each of the other managed forwarding elements in the plurality of managed forwarding elements.

18. The method of claim 11, wherein each NOS instance in the plurality of NOS instances is communicatively connected to each of the other NOS instances in the plurality of NOS instances in order to exchange the forwarding state information.

19. The method of claim 11 further comprising:
configuring a first NOS instance to send a request to a second NOS instance to obtain the forwarding state information that the second NOS instance maintains; and configuring the second NOS instance to send, upon receiving the request, a response including the requested forwarding state information to the first NOS instance.

20. The method of claim 19, wherein the first NOS instance in the plurality of NOS instances is not communicatively connected to the second NOS instance in the plurality of NOS instances wherein the method further comprises configuring a third NOS instance of the plurality of NOS instances to relay the request to the second NOS instance.

21. The method of claim 20, wherein the third NOS instance is communicatively connected to the first NOS instance and the second NOS instance.

* * * * *